US008340104B2

(12) United States Patent
Kusama et al.

(10) Patent No.: US 8,340,104 B2
(45) Date of Patent: Dec. 25, 2012

(54) COMMUNICATION NETWORK SYSTEM, PATH CALCULATION DEVICE, AND COMMUNICATION PATH ESTABLISHMENT CONTROL METHOD

(75) Inventors: Kazuhiro Kusama, Yokohama (JP); Shuji Maeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 660 days.

(21) Appl. No.: 12/481,621

(22) Filed: Jun. 10, 2009

(65) Prior Publication Data

US 2010/0034205 A1 Feb. 11, 2010

(30) Foreign Application Priority Data

Aug. 8, 2008 (JP) ................................. 2008-206093

(51) Int. Cl.
*H04L 12/28* (2006.01)
(52) U.S. Cl. ........ 370/400; 370/235; 370/351; 709/226; 709/238
(58) Field of Classification Search ........................ None
See application file for complete search history.

(56) References Cited

U.S. PATENT DOCUMENTS

| 2005/0141527 | A1* | 6/2005 | Gateva et al. ................. 370/401 |
| 2005/0270306 | A1* | 12/2005 | Nomura ........................ 345/619 |
| 2006/0083251 | A1 | 4/2006 | Kataoka et al. |
| 2006/0098657 | A1* | 5/2006 | Vasseur et al. ................ 370/392 |
| 2006/0221865 | A1* | 10/2006 | Hawbaker et al. ............ 370/255 |
| 2008/0240120 | A1 | 10/2008 | Kusama et al. |
| 2009/0164655 | A1* | 6/2009 | Pettersson et al. ............ 709/231 |

FOREIGN PATENT DOCUMENTS

| JP | 2005-252385 A | 9/2005 |
| JP | 2005-323129 A | 11/2005 |
| JP | 2006-121249 A | 5/2006 |
| JP | 2008-252439 A | 10/2008 |

OTHER PUBLICATIONS

R. Bradford et al., Preserving Topology Confidentiality in Inter-Domain Path Computation and Signaling, IETF Internet Draft, Jun. 2006.

* cited by examiner

*Primary Examiner* — Ayaz Sheikh
*Assistant Examiner* — Nicholas Sloms
(74) *Attorney, Agent, or Firm* — Mattingly & Malur, PC

(57) ABSTRACT

In an MPLS or GMPLS network, links for hops of a communication path and adaptation to be implemented on the border of management domains or layers are automatically appropriately selected based on a service type or a requirement for maintenance. First, a unit that appends an identifier of a service to be provided and an attribute of the service to a communication path establishment control message, and requests path establishment is installed in a source node. Secondly, a unit that determines a requirement for maintenance of the communication path and adaptation on the basis of the service identifier and/or service attribute is installed in each node. Thirdly, maintenance attributes of network resources are compared with the requirement for maintenance in order to determine links and nodes through which the communication path passes. The determined links, nodes, and adaptation are designated as action parameters for a switching unit and/or interface unit.

17 Claims, 29 Drawing Sheets

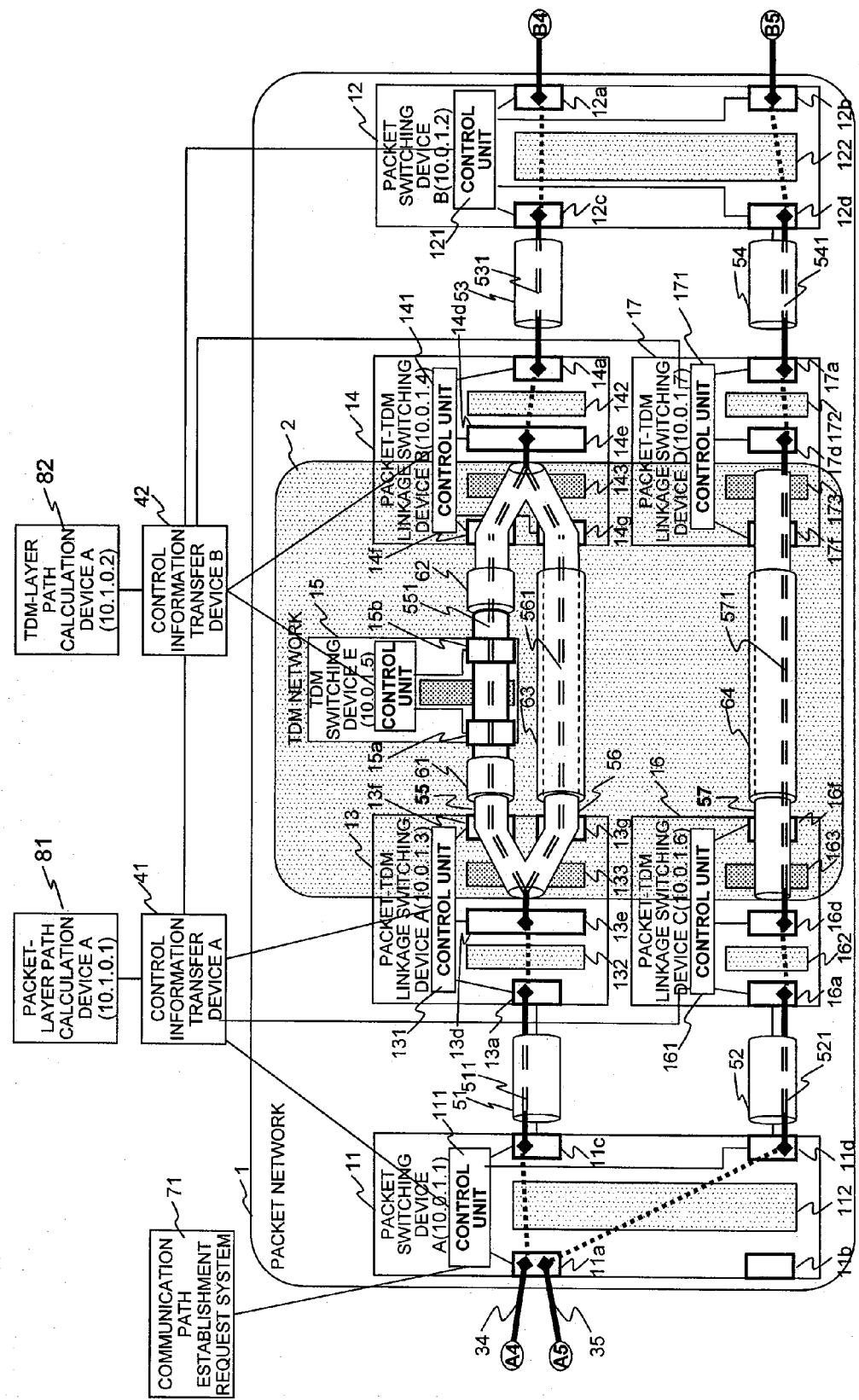

| NAME OF INTERFACE | INTERFACE IDENTIFIER |
|---|---|
| PACKET INTERFACE UNIT 11a | 101 |
| PACKET INTERFACE UNIT 11b | 102 |
| PACKET INTERFACE UNIT 11c | 103 |
| PACKET INTERFACE UNIT 11d | 104 |
| PACKET INTERFACE UNIT 12a | 101 |
| PACKET INTERFACE UNIT 12b | 102 |
| PACKET INTERFACE UNIT 12c | 103 |
| PACKET INTERFACE UNIT 12d | 104 |
| PACKET INTERFACE UNIT 13a | 101 |
| PACKET-TDM LINKAGE INTERFACE UNIT 13d | 201 |
| TDM INTERFACE UNIT 13f | 301 |
| TDM INTERFACE UNIT 13g | 302 |
| PACKET INTERFACE UNIT 14a | 101 |
| PACKET-TDM LINKAGE INTERFACE UNIT 14d | 201 |
| TDM INTERFACE UNIT 14f | 301 |
| TDM INTERFACE UNIT 14g | 302 |
| TDM INTERFACE UNIT 15a | 301 |
| TDM INTERFACE UNIT 15b | 302 |
| PACKET INTERFACE UNIT 16a | 101 |
| PACKET-TDM LINKAGE INTERFACE UNIT 16d | 201 |
| TDM INTERFACE UNIT 16f | 301 |
| PACKET INTERFACE UNIT 17a | 101 |
| PACKET-TDM LINKAGE INTERFACE UNIT 17d | 201 |
| TDM INTERFACE UNIT 17f | 301 |

FIG. 2

| NAME OF LINK | LINK IDENTIFIER |
|---|---|
| PACKET LINK 51 | [10.0.1.1, 103, 10.0.1.3, 101] |
| PACKET LINK 52 | [10.0.1.1, 104, 10.0.1.6, 101] |
| PACKET LINK 53 | [10.0.1.2, 103, 10.0.1.4, 101] |
| PACKET LINK 54 | [10.0.1.2, 104, 10.0.1.7, 101] |
| PACKET LINK (TDM-LSP)55 | [10.0.1.3, 201, 10.0.1.4, 201] |
| PACKET LINK (TDM-LSP)57 | [10.0.1.6, 201, 10.0.1.7, 201] |
| TDM LINK 61 | [10.0.1.3, 301, 10.0.1.5, 301] |
| TDM LINK 62 | [10.0.1.4, 301, 10.0.1.5, 302] |
| TDM LINK 63 | [10.0.1.3, 302, 10.0.1.4, 302] |
| TDM LINK 64 | [10.0.1.6, 301, 10.0.1.7, 301] |

FIG. 3

GMPLS RSVP-TE MESSAGE REQUESTING ESTABLISHMENT OF PSC-LSP 34

GMPLS RSVP-TE MESSAGE REQUESTING ESTABLISHMENT OF PSC-LSP 35

FIG. 13A

SERVICE DEFINITION TABLE (PACKET LAYER)

| CONDITION FOR SERVICE IDENTIFIER | if | | then | |
|---|---|---|---|---|
| | CONDITION FOR SERVICE ATTRIBUTE | REQUIREMENT FOR MAINTENANCE | ADAPTATION | |
| Enterprise_data | true(VoIP) | max_fail_time < 1sec<br>maintenance_time must_be_in "0:00–5:00" | PSC.toGbEAlarm_forwarder.guardTime=500msec | |
| Enterprise_data | false(VoIP) | max_fail_time < 30sec<br>maintenance_time must_be_in "0:00–5:00" | PSC.toGbEAlarm_forwarder.guardTime=1sec | ⇦ PSC-LSP35 |
| TV_realtime_relay | grade == high | max_fail_time < 100msec<br>maintenance_time must_be_in "0:00–5:00" | PSC.toGbEAlarm_forwarder.guardTime=50msec | ⇦ PSC-LSP34 |
| TV_Broadcast | grade == high | max_fail_time < 1sec<br>maintenance_time = "3:00–5:00" | PSC.toGbEAlarm_forwarder.guardTime=500msec | |
| TV_Broadcast | grade == economy | max_fail_time < 30sec<br>maintenance_time = "0:00–5:00" | PSC.toGbEAlarm_forwarder.guardTime=1sec | |

8033 / 1101 / 1102 / 1103 / 1104

| | if | | then | |
|---|---|---|---|---|
| | CONDITION FOR SERVICE IDENTIFIER | CONDITION FOR SERVICE ATTRIBUTE | REQUIREMENT FOR MAINTENANCE | ADAPTATION |
| | Enterprise_data | true(VoIP) | max_fail_time < 100msec<br>maintenance_time must_be_in "0:00–5:00" | STM16.toPscAlarm_forwarder.guardTime=100msec |
| | Enterprise_data | false(VoIP) | max_fail_time < 10sec<br>maintenance_time must_be_in "0:00–5:00" | STM16.toPscAlarm_forwarder.guardTime=500msec |
| | TV_realtime_relay | grade == high | max_fail_time < 30msec<br>maintenance_time must_be_in "0:00–5:00" | STM16.HitlessPathProtection=enabled<br>STM16.toPscAlarm_forwarder.guardTime=30msec |
| | TV_Broadcast | grade == high | max_fail_time < 100msec<br>maintenance_time = "3:00–5:00" | STM16.toPscAlarm_forwarder.guardTime=100msec |
| | TV_Broadcast | grade == economy | max_fail_time < 10sec<br>maintenance_time = "0:00–5:00" | STM16.toPscAlarm_forwarder.guardTime=500msec |

⇩ PSC-LSP35 (row 4)
⇩ PSC-LSP34 (row 5)

SERVICE DEFINITION TABLE (TDM LAYER)

FIG. 13B

| SWITCHING CAPABILITY | RUNNING ATTRIBUTE | LINK END A | | LINK END B | | MAINTENANCE ATTRIBUTE |
|---|---|---|---|---|---|---|
| | | ROUTER IDENTIFIER A | INTERFACE IDENTIFIER A | ROUTER IDENTIFIER B | INTERFACE IDENTIFIER B | |
| PSC | ENABLED | 10.0.1.1 | 103 | 10.0.1.3 | 101 | max_fail_time = 300msec<br>maintenance_time = "0:00–3:00" |
| PSC | ENABLED | 10.0.1.1 | 104 | 10.0.1.6 | 102 | max_fail_time = 300msec<br>maintenance_time = "3:00–6:00" |
| PSC | ENABLED | 10.0.1.2 | 103 | 10.0.1.4 | 101 | max_fail_time = 300msec<br>maintenance_time = "0:00–3:00" |
| PSC | ENABLED | 10.0.1.2 | 104 | 10.0.1.7 | 102 | max_fail_time = 300msec<br>maintenance_time = "3:00–6:00" |
| PSC | ENABLED | 10.0.1.3 | 201 | 10.0.1.4 | 201 | max_fail_time = 300msec<br>maintenance_time = "3:00–5:00" |
| PSC | ENABLED | 10.0.1.6 | 201 | 10.0.1.7 | 201 | max_fail_time = 300msec<br>maintenance_time = "3:00–5:00" |

LINK ATTRIBUTE TABLE (PACKET-LAYER PATH CALCULATION DEVICE A)

FIG. 14A

SESSION MANAGEMENT TABLE (PACKET SWITCHING DEVICE A)

| SESSION IDENTIFIER | PREVIOUS HOP | SUB-SEQUENT HOP | SERVICE IDENTIFIER | RSVP INFORMATION ||||| ADAPTATION INFORMATION |
|---|---|---|---|---|---|---|---|---|---|
| | | | | SERVICE ATTRIBUTE | EXPLICIT ROUTE | MISCEL-LANEOUS RSVP OBJECT 1 | ... | MISCEL-LANEOUS RSVP OBJECT n | |
| dst=10.0.1.2, tunnelId=1 extId=10.0.1.1 | — | IPv4Addr= 10.0.1.3, IF_ID=101 | TV_realtime_relay | max_fail_time=30sec, acceptable_down_hour= {22:00—3:00} | {10.0.1.3, 101,S} {10.0.1.4, 201,S} {10.0.1.2, 103,S} | — | — | — | PSC:toGbeAlarmforwarder.guard Time=1000 |
| dst=10.0.1.2, tunnelId=2 extId=10.0.1.1 | — | IPv4Addr= 10.0.1.4, IF_ID=101 | Enterprise_data | max_fail_time=30sec, acceptable_down_hour= {0:00—5:00} | {10.0.1.6, 101,S} {10.0.1.7, 201,S} {10.0.1.2, 104,S} | — | — | — | |

⇐ PSC-LSP34
⇐ PSC-LSP35

SESSION MANAGEMENT TABLE (PACKET-TDM LINKAGE SWITCHING DEVICE A)

| | | | RSVP INFORMATION | | | | | |
|---|---|---|---|---|---|---|---|---|
| SESSION IDENTIFIER | PREVIOUS HOP | SUB-SEQUENT HOP | SERVICE IDENTIFIER | SERVICE ATTRIBUTE | EXPLICIT ROUTE | MISCEL-LANEOUS RSVP OBJECT 1 | ... MISCEL-LANEOUS RSVP OBJECT n | ADAPTATION INFORMATION |
| dst=10.0.1.2, tunnelId=1 extId=10.0.1.1 | IPv4Addr= 10.0.1.3, IF_ID=103 | IPv4Addr= 10.0.1.3, IF_ID=101 | TV_realtime_relay | max_fail_time=30sec, acceptable_down_hour= {22:00–3:00} | {10.0.1.3, 101,S}; {10.0.1.4, 201,S}; {10.0.1.2, 103,S} | — | — | STM16.toPscAlarmForwarder.guard Time=100 | ⇐ PSC-LSP34
| dst=10.0.1.4, tunnelId=1 extId=10.0.1.3 | — | IPv4Addr= 10.0.1.4, IF_ID=302 | — | — | {10.0.1.4, 302,S} | Protection= (pri, work) | — | STM16.HitlessPathProtection. enable=true | ⇐ TDM-LSP55-primary
| dst=10.0.1.4, tunnelId=1 extId=10.0.1.3 | — | IPv4Addr= 10.0.1.5, IF_ID=301 | — | — | {10.0.1.5, 301,S}; {10.0.1.4, 301,S} | Protection= (sec, stby) | — | STM16.HitlessPathProtection. enable=true | ⇐ TDM-LSP55-secondary

PROCESSING TO BE PERFORMED ON RECEIPT OF PATH MESSAGE

PROCESSING TO BE PERFORMED ON RECEIPT OF RESV MESSAGE

FIG. 20A

TICKET VALIDITY MANAGEMENT TABLE
(PACKET-LAYER PATH CALCULATION DEVICE A)

| TICKET NUMBER | VALIDITY TIMER |                              |
|---|---|---|
| 1 | 59,000 | ⇦ DEVICE 11a ON PSC-LSP 34 |
| 2 | 59,000 | ⇦ DEVICE 12a ON PSC-LSP 34 |
| 3 | 29,000 | ⇦ DEVICE 11a ON PSC-LSP 35 |
| 4 | 29,000 | ⇦ DEVICE 12b ON PSC-LSP 35 |

TICKET VALIDITY MANAGEMENT TABLE
(TDM-LAYER PATH CALCULATION DEVICE A)

| TICKET NUMBER | VALIDITY TIMER |                                           |
|---|---|---|
| 1 | 60,000 | ⇦ DEVICE 13d ON PSC-LSP 34 AND TDM-LSP 55 |
| 2 | 59,500 | ⇦ DEVICE 14d ON PSC-LSP 34 AND TDM-LSP 55 |
| 3 | 30,000 | ⇦ DEVICE 16d ON PSC-LSP 35 |
| 4 | 29,500 | ⇦ DEVICE 17d ON PSC-LSP 35 |

8035  80351  80352

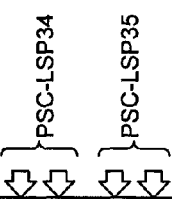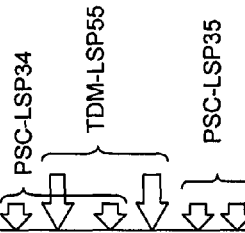
FIG. 21A
FIG. 21B

COMMUNICATION NETWORK SYSTEM, PATH CALCULATION DEVICE, AND COMMUNICATION PATH ESTABLISHMENT CONTROL METHOD

CLAIM OF PRIORITY

The present application claims priority from Japanese patent application JP 2008-206093 filed on Aug. 8, 2008, the content of which is hereby incorporated by reference into this application.

FIELD OF THE INVENTION

The present invention relates to a communication network system, a path calculation device, and a communication path establishment control method. More particularly, the present invention is concerned with a communication network system, a communication device, and a communication path establishment control method for establishing a communication path over management domains or layers in a communication network which accommodates multiple management domains or object-of-management layers.

BACKGROUND OF THE INVENTION

As the technology for dynamically setting up a communication path in a communication network, the Multiprotocol Label Switching (MPLS) (IETF RFC3031 standard by E. Rosen et al.) architecture, and the Generalized Multiprotocol Label Switching (GMPLS) (IETF RFC3945 standard by E. Mannie) architecture are adoptable. The technology is to set up a label switched path (LSP), which is a virtual communication path, in a communication network, which includes TDM switches, time-division multiplexers, packet switches, and other network devices, according to a signaling protocol such as the Generalized Multiprotocol Label Switching (GMPLS) Signaling Resource Reservation Protocol-Traffic Engineering (RSVP-TE) Extensions (GMPLS RSVP-TE) (IETF RFC3473 standard by L. Berger).

A technology described in patent document 1 (JP-A-2005-252385) or a technology described in non-patent document 1 (R. Bradford et al., "Preserving Topology Confidentiality in Inter-Domain Path Computation and Signaling," IETF Internet draft, draft-bradford-pce-path-key-00.txt, 2006 Jun. 16) is known as a method for establishing a communication path over layers or management domains through signaling in a case where a GMPLS network or any other network includes multiple layers or multiple management domains.

According to the technology described in the patent document 1, when a communication path is established according to the RSVP-TE, a link (that is, a communication path in a lower-level layer) to be employed in a communication path can be determined for each service that utilizes the communication path. Specifically, a service identifier is assigned in advance to the communication path in the lower-level layer, and an edge node in an upper-level layer issues a communication path establishment request with the service identifier appended to the request. A node on the border between the layers selects a link, of which the service identifier squares with the service identifier contained in the received communication path establishment request, from among selectable links.

The technology described in the non-patent document 1 provides a means that when a communication path is established using the GMPLS between a node within a first management domain (hereinafter, domain 1) and a node within a second management domain (hereinafter, domain 2), a route to be followed by the communication path is determined through collaboration processing among management entities called path computation elements (PCEs) that manage respective domains.

To be more specific, when a source node requests the PCE in the domain 1 (hereinafter, PCE 1) to perform route calculation, the PCE 1 calculates the route of a communication path for an interval in the domain 1 (hereinafter, interval 1), and requests the PCE 2 to perform calculation of the route of a communication path for an interval in the domain 2 (hereinafter, interval 2). The PCE 2 returns key information (path key), which represents the result of the calculation for the interval 2, to the PCE 1. The PCE 1 returns the route for the interval 1 and the path key for the interval 2 to the source node.

The source node issues a communication path establishment request that contains the path for the interval 1 and the path key for the interval 2. A border node between the domain 1 and domain 2 uses the received path key to query the PCE 2, and thus acquires the route for the interval 2 so as to establish the communication path for the interval 2.

SUMMARY OF THE INVENTION

The present invention makes it possible to, every time a communication path is established, determine a link, which is employed in each hop of the communication path, in automatic consideration of a requirement for maintenance of the communication path (expressed by, for example, an equation of a restrictive condition that a maintenance attribute of each link along which the communication path to be established passes should satisfy) and a maintenance attribute of a network resource (for example, an attribute characterizing how the link should be maintained). The present invention also makes it possible to automatically configure adaptation (any of various connection facilities) that varies depending on a service type or a requirement for maintenance and that is needed to set up a communication path over layers or management domains.

What is referred to as the maintenance attribute of a network resource is an attribute of a network resource such as a data switch, a network interface, or a link for each hop, which is employed in a communication path, concerning maintenance. The maintenance attribute includes, for example, a time zone for a scheduled construction, a replacement time zone in case of a failure, presence or absence of an object of regular replacement, a maintenance person, a manufacturing vendor, presence or absence of auxiliary parts, a mean time between failures (MTBF), a mean time to repair (MTTR), an article number, a version number of an article, presence or absence of a failure discrimination testing facility, presence or absence of a general liability insurance, and presence or absence of a free-of-charge replacement guaranty agreement.

What is referred to as the requirement for maintenance of a communication path corresponds to a maintenance attribute which a network resource employed in a communication path over which a service is provided should satisfy and which is expressed by a restrictive conditional equation.

According to the technology described in the patent document 1, a communication path in a lower-level layer which a communication path in a certain layer employs can be controlled for each service identifier. However, the control is based on comparison of the service identifier. Therefore, as long as the same service is concerned, even if a requirement for maintenance is different, the communication path in the certain layer may be accommodated by the communication path in the lower-level layer. For example, if the service is a wide-area LAN service at 100 Mbps, a line for a financial business service whose discontinuation during daytime is unpermitted and an access line for a television broadcast service whose discontinuation in the evening and at midnight is unpermitted may be accommodated by the same communication path in the lower-level layer. Therefore, the time for maintenance work including remodeling of a facility in the lower-level layer is restricted.

The technology described in the patent document 1 does not specify a method of controlling adaptation. The adaptation is, similarly to the requirement for maintenance, diversified, and is thought to pose a similar problem.

The technology described in the non-patent document 1 is intended mainly to allow the domains 1 and 2 to shield the topologies in the domains 1 and 2 from each other, and has no direct relation to the problem to be solved by the present invention. However, when the technology is combined with the one described in the patent document 1, if the PCE 2 determines adaptation, a data size to be carried according to the GMPLS signaling protocols can presumably be diminished. However, since a control sequence is complex, it may pose another problem.

The present invention addresses the foregoing problems. There is a need for automatically selecting a link, which is employed in each hop of a communication path, and adaptation, which is needed in a management domain or on the border between layers, according to a service type or a requirement for maintenance.

According to an embodiment of the present invention, first, a source node is provided with a means that requests path establishment by appending an identifier of a service to be provided and an attribute of the service to a communication path establishment control message.

Secondly, each node is provided with a means that when having received the path establishment control message, transmits a path calculation request containing the service identifier and/or the service attribute to a path calculation device, and configuring adaptation for an own node on the basis of adaptation information contained in a response received from the path calculation device.

Thirdly, each path calculation device includes a means that determines a requirement for maintenance of a communication path and adaptation on the basis of the service identifier and/or the service attribute. Each path calculation device uses the means, which determines the requirement for maintenance of a communication path and the adaptation, to assess the identifier of the service and/or the attribute inherent to the service which are contained in a received path establishment control message, and thus determines the requirement for maintenance of the communication path and/or the adaptation.

Fourthly, the path calculation device includes a means that preserves the maintenance attribute of a network resource such as a node or a link between nodes. Further, the path calculation device includes a means that compares the maintenance attributes of network resources with the requirement for maintenance of a communication path so as to select links and nodes, which can satisfy the requirement for maintenance, over an entire interval for which path calculation has been requested, thus determines the route of the path, and returns the determined path route and adaptation to a request source.

Fifthly, the path calculation device includes a means that requests a second path calculation device to determine a detailed route of a path and/or adaptation for a portion of an interval for which path calculation has been requested, receives a response, inserts the route and/or adaptation information, which are contained in the received response, into portions of a path route and adaptation information, which an own path calculation device has determined, relating to the interval portion, and thus produces a response to the path calculation request received by the own path calculation device.

Sixthly, the path calculation device includes a means that assigns a tag, which is independent of a type of adaptation, to the adaptation information, and preserves the relationship of association between the adaptation and tag, a means that returns the tag instead of the adaptation of a response, and a means that when the tag is contained in the path calculation request, returns the associated adaptation.

Seventhly, the path calculation device includes a means that when the tag is assigned, designates a valid period of the tag and that when the valid period is expired, invalidates the tag.

Eighthly, each node is provided with a means that requests path establishment with the tag appended to a communication path establishment control message, and a means that when having received the establishment control message that contains the tag information, requests the issuance source of the tag to develop the tag, and receives the result of the development. The path calculation device includes a means that receives a tag development request, a developing means, and a means that returns the result of the development.

According to an embodiment of the present invention, there is, for example, provided a communication network system that includes multiple data transfer devices and establishes a communication path by transferring a communication path establishment control signal among the multiple data transfer devices.

The multiple data transfer devices include a control information transfer means.

The communication path establishment control signal contains an identifier of a service to be provided over the communication path.

The communication path establishment control signal contains a service attribute that characterizes a service to be identified with the service identifier.

In the communication network system in accordance with the embodiment of the present invention, the data transfer device can specify a requirement for maintenance of a communication path, which is established in response to the communication path establishment control signal, on the basis of the service identifier and the service attribute.

The data transfer device can preserve maintenance attributes of network resources constituting the communication network system.

The data transfer device can compare the requirement for maintenance with the maintenance attributes, and select network resources, which satisfy the requirement for maintenance, as network resources forming the communication path to be established in response to the communication path establishment control signal.

Further, the communication network system in accordance with the embodiment of the present invention can include multiple management domains and/or multiple layers.

The data transfer device can include an adaptation facility capable of being controlled in relation to each communication path between the management domains and/or layers.

The data transfer device can set up the adaptation facility on the basis of the service identifier and service attribute.

According to the first solving means of the present invention, there is provided a communication network system comprising a plurality of nodes and a first path calculation device, and transferring a control signal, which is used to establish a path among the plurality of nodes, so as to establish the path the first path calculation device includes a service definition table in which a service identifier, a service attribute, a requirement for maintenance, and adaptation are recorded in association with one another, and a link attribute table in which a link and a maintenance attribute of the link are recorded in association with each other;

the nodes include a session management table in which a session identifier, a service identifier, a service attribute, an explicit route, and adaptation information are recorded in association with one another;

wherein:

a first node serving as an origin of the path transmits a path calculation request, which contains the service identifier and service attribute, to the first path calculation device;

the first path calculation device uses the service definition table to determine the requirement for maintenance, which links for hops of a communication path to be established should satisfy, on the basis of the received service identifier and service attribute;

the first path calculation device extracts a plurality of links, of which maintenance attributes satisfy the determined requirement for maintenance, from the link attribute table, and determines a candidate for a route of the communication path, which satisfies the requirement for maintenance in relation to each of the hops, in a network formed with the extracted plurality of links, and/or determines the adaptation, which is any of various connection facilities to be implemented at the end point of the path, by searching the service definition table on the basis of the service identifier and service attribute;

the first path calculation device produces a path calculation response, which contains the determined candidate for the route and/or adaptation information, and returns the path calculation response to the first node of the request source;

if the received path response contains the adaptation information, the first node records the adaptation information, which is contained in the received path calculation response, in the session management table in association with the service identifier, service attribute, and explicit route; and the first node sets up an adaptation facility for the own node on the basis of the adaptation information contained in the path calculation response received from the first path calculation device, and transmits the path establishment request, which contains the service identifier, service attribute, and explicit route, to a second node terminating the subsequent hop.

According to the second solving means of the present invention, there is provided a path calculation device in a communication network system comprising a plurality of nodes and the path calculation device, and transferring a control signal, which is used to establish a path among the plurality of nodes, so as to establish the path:

the path calculation device includes a service definition table in which a service identifier, a service attribute, a requirement for maintenance, and adaptation are recorded in association with one another, and a link attribute table in which a link and a maintenance attribute of the link are recorded in association with each other;

wherein:

the path calculation device receives a path calculation request, which contains the service identifier and service attribute, from a first node serving as an origin of the path;

the path calculation device uses the service definition table to determine the requirement for maintenance, which links for hops of a communication path to be established should satisfy, on the basis of the received service identifier and service attribute;

the path calculation device extracts a plurality of links, of which maintenance attributes satisfy the determined requirement for maintenance, from the link attribute table, and determines a candidate for a route of the communication path, which satisfies the requirement for maintenance in relation to each of the hops, in a network formed with the extracted plurality of links, and/or determines the adaptation, which is any of various connection facilities to be implemented at the end point of the path, by searching the service definition table on the basis of the service identifier and service attribute;

the first path calculation device produces a path calculation response, which contains the determined candidate for the route and/or adaptation information, and returns the path calculation response to the first node of the request source.

According to the third solving means of the present invention, there is provided a communication path establishment control method in a communication network system that includes a plurality of nodes and a first path calculation device, and transfers a control signal, which is used to establish a path among the plurality of nodes, so as to establish the path:

the first path calculation device including a service definition table in which a service identifier, a service attribute, a requirement for maintenance, and adaptation are recorded in association with one another, a link attribute table in which a link and a maintenance attribute of the link are recorded in association with each other, and a contents-of-ticket management table in which the relationship of association between an adaptation ticket and adaptation is recorded, and the nodes including a session management table in which a session identifier, a service identifier, a service attribute, an explicit route, and adaptation information are recorded in association with one another, the communication path establishment control method comprising the steps of:

transmitting a path calculation request, which contains the service identifier and service attribute, from a first node serving as an origin of a path to the first path calculation device;

referencing the service definition table by the first path calculation device on the basis of the received service identifier and service attribute so as to determine a requirement for maintenance which links for hops of a communication path to be established should satisfy;

extracting a plurality of links, of which maintenance attributes satisfy the determined requirement for maintenance, from the link attribute table by the first path calculation device, and determining a candidate for a route of the communication path, which satisfies the requirement for maintenance in relation to each of the hops, in a network formed with the extracted plurality of links;

searching the service definition table by the first path calculation device on the basis of the service identifier and service attribute so as to determine adaptation that is any of various connection facilities to be implemented at the end point of a path, issuing an adaptation ticket that is a tag which is independent of an adaptation type and assigned to the adaptation information, and that contains the path calculation device identifier of an issuance source and a ticket identifier, recording the adaptation information and ticket identifier in the contents-of-ticket management table;

producing a path calculation response by the first path calculation device, the path calculation response that contains identifiers of nodes existing along the route and the issued adaptation ticket as objects of an explicit route in the order appearing on the communication path to be established and that also contains the service identifier and service attribute, and returning the path calculation response to the first node of the request source;

interpreting the explicit route, which is contained in the path calculation response received by the first node, from the beginning, if the adaptation ticket appears, issuing a path calculation request, which contains the adaptation ticket, by the first node to the first path calculation device identified with the path calculation device identifier contained as a ticket issuance source in the adaptation ticket;

when having received the path calculation request containing the adaptation ticket, obtaining the adaptation information, which is held at the time of issuance of the adaptation ticket, from the contents-of-ticket management table by the first path calculation device, and returning a path calculation response, which contains the adaptation information and explicit route, to the first node of the request source;

recording the adaptation information, which is contained in the received path calculation response, in the session management table by the first node in association with the service identifier, service attribute, and explicit route;

setting up an adaptation facility for the own node on the basis of the adaptation information contained in the path calculation response which the first node has received from the first path calculation device; and transmitting a path establishment request, which contains the service identifier, the service attribute, and the explicit route with the adaptation ticket, from the first node to a second node terminating the subsequent hop.

According to the embodiment of the present invention, when establishment of a communication path is requested, a service type and an attribute inherent to each service can be interchanged between layers or management domains in relation to each communication path. Therefore, determination of the relationship of accommodation based on specification of a requirement for maintenance or determination of adaptation can be achieved according to the service type and service attribute without the necessity of transferring control information in advance between the layers or management domains.

BRIEF DESCRIPTION OF THE DRAWINGS

FIG. 1 is a block diagram showing a network system;

FIG. 2 is a table listing interface identifiers of interface units included in respective GMPLS switches;

FIG. 3 is a table listing link identifiers of links among GMPLS switches;

FIG. 13A is a diagram showing the construction of a service definition table 8033 (packet layer) preserved by a path calculation device;

FIG. 13B is a diagram showing the construction of a service definition table 8033 (TDM layer) preserved by the path calculation device;

FIG. 14A is a diagram showing the construction of a link attribute table 8034 (packet layer path calculation device A) preserved by a path calculation device;

FIG. 16A is a diagram showing the construction of a session management table 8020 (packet switching device A) preserved by a GMPLS switch;

FIG. 16B is a diagram showing the construction of a session management table 8020 (packet-TDM linkage switching device A) preserved by the GMPLS switch;

FIG. 20A and FIG. 20B are diagrams showing the construction of a ticket validity management table 8035 preserved by a path calculation device; and FIG. 21A and FIG. 21B are diagrams showing the construction of a contents-of-ticket management table 8036 preserved by a path calculation device.

DESCRIPTION OF THE PREFERRED EMBODIMENTS

Figure 4:
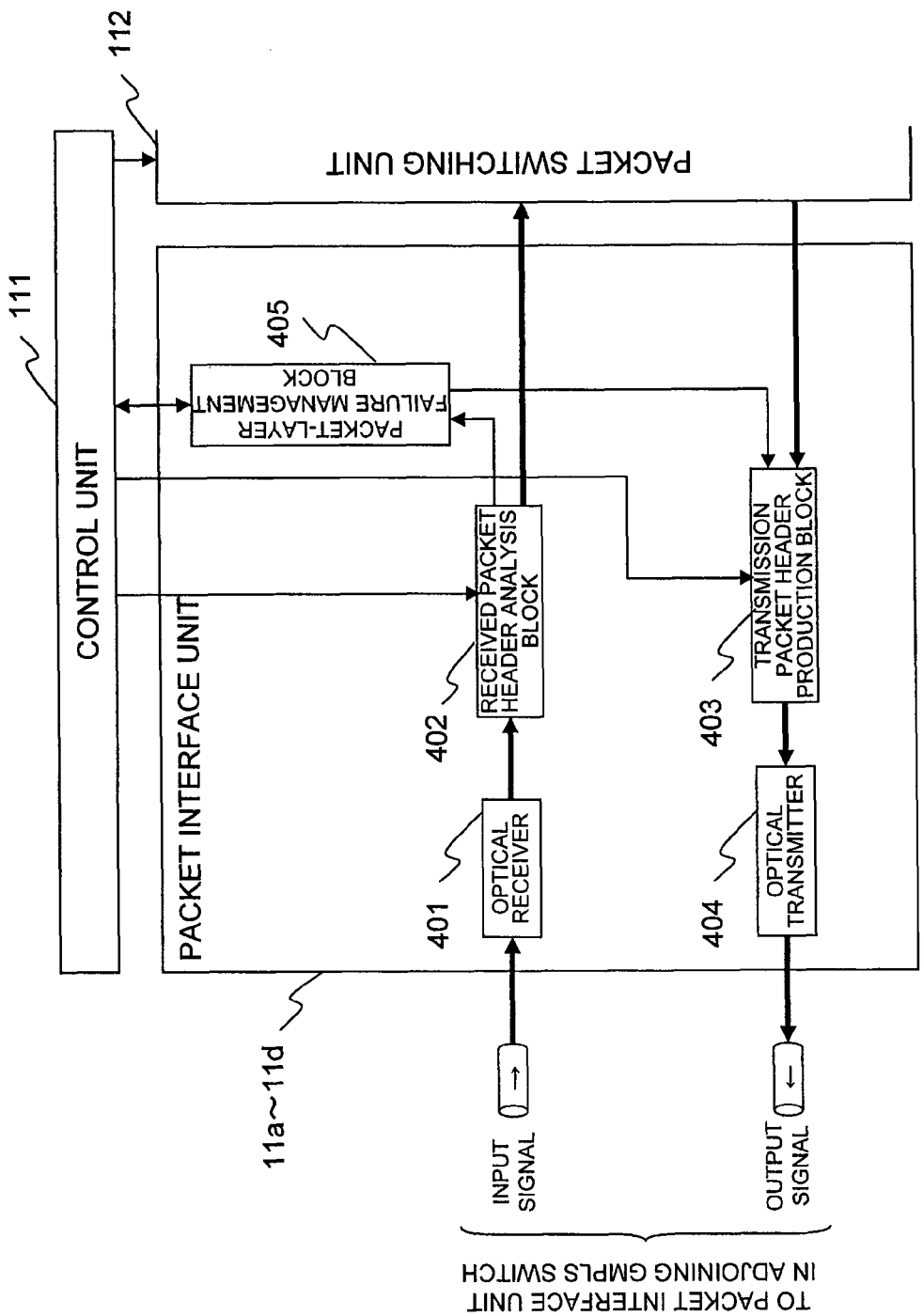
FIG. 4 is a block diagram showing a packet interface unit.

An embodiment of the present invention will be described below.

1. Communication Network System

The first embodiment will be described on the assumption that the GMPLS RSVP-TE extensions are adopted as a signaling protocol, and the GMPLS OSPF-TE extensions are adopted as a link state type routing protocol. Even when the OSI IS-IS Intra-domain Routing Protocol (IS-IS) protocol (IETF RFC1142 standard), the Generalized Multiprotocol Label Switching (GMPLS) Signaling Constraint-based Routed Label Distribution Protocol (CR-LDP) (GMPLS CR-LDP) Extensions (IETF RFC3472 standard), or any other protocol is adopted, the present embodiment can be applied.

FIG. 1 is a block diagram showing a network system in accordance with the first embodiment of the present invention.

The network system in accordance with the first embodiment refers to a GMPLS network in which a message stipulated in the GMPLS RSVP-TE extensions and GMPLS OSPF-TE extensions is transmitted or received over a link other than a communication path 61 to be established.

The network system in accordance with the first embodiment includes a packet network 1 and/or a TDM network 2.

The packet network 1 and TDM network 2 each include one or more GMPLS switches, links over which user data is transferred among the switches, a control information transfer device A41 or a control information transfer device B42 that transfers control information, and a packet-layer path calculation device A81 or a TDM-layer path calculation device A82 that calculates a route along which a path should pass and adaptation on the basis of a request sent from the GMPLS switch.

The GMPLS switches in the packet network 1 refer, in practice, to packet switching devices A11 and B12 and/or packet-TDM linkage switching devices A13 and B14. The links refer to packet links 51 to 54. The packet switching devices A11 and B12 and the packet-TDM linkage switching devices A13 and B14 can query the packet-layer path calculation device A81 about a route of a path to be established and adaptation.

The GMPLS switches in the TDM network 2 refer, in practice, to the packet-TDM linkage switching devices A13 and B14 and/or a TDM switching device E15. The links refer to TDM links 61 to 64. The packet-TDM linkage switching devices A13 and B14 and the TDM switching device E15 can query the TDM-layer path calculation device A82 about a route of a path to be established and adaptation (any of various connection facilities, which handle connection between networks at the time of especially setting up a communication path over layers or management domains, such as packet encapsulation processing, traffic flow separation/integration, quality-of-service (QoS) mapping, alarm transfer processing, and code conversion).

Each of the GMPLS switches includes one or more interface units through which user data is transferred, one or more switching units through which the transfer destination of the user data is controlled, and a control unit that controls the interface unit and switching unit.

In each of the packet switching devices A11 and B12, the interface units refer, in practice, to packet interface units that terminate a packet link. Likewise, the switching unit refers to a packet switching unit.

In the TDM switching device E15, the interface units refer, in practice, to TDM interface units that terminate a TDM link. Likewise, the switching unit refers to a TDM switching unit.

The interface units in each of the packet-TDM linkage switches A13 and B14 refer, in practice, to a packet interface unit that terminates a packet link, and a TDM interface unit that terminates a TDM link. Likewise, both a packet switching unit and a TDM switching unit are included as the switching units.

The packet interface unit transfers packet-multiplexed user data to or from the packet interface unit in the adjoining packet switching device or packet-TDM linkage switching device over the packet link.

The TDM interface unit transfers time-division multiplexed user data to or from the TDM interface unit in the adjoining TDM switching device or packet-TDM linkage switching device over the TDM link.

When the network system in accordance with the present embodiment includes multiple layers, that is, both the packet network 1 and TDM network 2, the packet network 1 further includes as packet links one or more packet links (Time-division Multiplexing-label switched paths (TDM-LSPs)) 55 to 57.

The packet network 1 and TDM network 2 are controlled in conformity with the GMPLS. User data is transmitted over established Packet Switching Capable-label switched paths (PSC-LSPs) 34 and 35.

The PSC-LSP 34 to be established between nodes A4 and B4 in the packet network 1 passes through the packet interface units 11*a* and 11*c* in the packet switching device A11, the packet link 51, the packet interface unit 13*a* in the packet-TDM linkage switching device A13, the packet interface unit 14*a* in the packet-TDM linkage switching device B14, the packet link 53, and the packet interface units 12*c* and 12*a* in the packet switching device B12. The PSC-LSP 34 has the capacity of band resources to be separated through packet multiplexing.

A packet-TDM linkage interface unit 13*d* and a packet-TDM linkage interface unit 14*d* through which the PSC-LSP 34 passes have a no-path failure time instantaneous discontinuation automatic switching facility in the TDM layer. If a failure occurs in the interval between the packet-TDM linkage interface unit 13*d* and packet-TDM linkage interface unit 14*d*, the packet-TDM linkage interface units autonomously restore from the failure.

The packet link 55 forming an interval portion of the PSC-LSP 34 passes through a TDM interface unit 13*f*, the TDM link 61, a TDM interface unit 15*a*, a TDM interface unit 15*b*, the TDM link 62, and a TDM interface unit 14*f* which are defined in a lower-level layer, and/or passes through a TDM interface unit 13*g*, the TDM link 63, and a TDM interface unit 14*g*. The interval portion is formed with the band resources (that is, individual time slots) that are separated through time-division multiplexing.

Likewise, the PSC-LSP 35 passes through the packet interface units 11*a* and 11*d* in the packet switching device A11, the packet link 52, a packet interface unit 16*a* and a packet-TDM linkage interface unit 16*d* in a packet-TDM linkage switching device C16, the packet link (TDM-LSP) 57, a packet-TDM linkage interface unit 17*d* and a packet interface unit 17*a* in a packet-TDM linkage switching device D17, the packet link 54, and the packet interface units 12*d* and 12*b* in the packet switching device B12. The PSC-LSP 35 has the capacity of band resources to be separated through packet multiplexing.

The packet link (TDM-LSP) 57 forming an interval portion of the PSC-LSP 35 passes through a TDM interface unit 16*f*, the TDM link 64, and a TDM interface unit 17*f* that are defined in the lower-level layer, and has the capacity of band resources (that is, time slots) to be separated through time-division multiplexing.

The packet network 1 and TDM network 2 have a client-and-server relationship based on a layering concept for transport networks stipulated in the ITU-T G.805 standard Generic Functional Architecture of Transport Networks. The client-and-server relationship between two layers is such that a link forming part of a path in a client layer is supported by a path in a server layer. In this drawing, assuming that the packet network 1 is regarded as a reference, the TDM network 2 is a server-layer network. Assuming that the TDM network 2 is regarded as a reference, the packet network 1 is a client-layer network.

The packet link (TDM-LSP) 55 and packet link (TDM-LSP) 57 serve as paths (LSPs) in the TDM network 2 and also serve as links in the packet network 1.

In a certain GMPLS switch, an interface unit is identified with an interface identifier. In the TDM network 2, the interface unit is uniquely identified with a combination of a router identifier and an interface identifier.

FIG. 2 shows the interface identifiers of the interface units shown in FIG. 1. For example, the interface identifier of the packet interface unit 11a is 101. Since the router identifier of the packet switching device A11 to which the packet interface unit 11a belongs is 10.0.1.1, the packet interface unit 11a is uniquely identified with a combination of [10.0.1.1, 101] in the packet network 1 and TDM network 2.

In the network system, a link is uniquely identified with a link identifier. The link identifier is a combination of router identifiers and interface identifiers of interface units connected to each other by the link.

FIG. 3 shows the link identifiers of the links shown in FIG. 1. For example, since the packet link 51 connects the interface units [10.0.1.1, 103] and [10.0.1.3, 101] to each other, the link identifier thereof is [10.0.1.1, 103, 10.0.1.3, 101].

A communication path establishment request system 71 is a network management system in an operating terminal, an element management system or an application system in a storage management server or a video server, or the like, and requests establishment of the PSC-LSP 34 or 35. Only one communication path establishment request system is shown in FIG. 1. Alternatively, an arbitrary number of communication path establishment request systems may be installed according to the number of end points of communication paths to be established. The communication path establishment request system 71 may be connected to the GMPLS switches at the end points, that is, the origin and end point of signaling, may be connected to the GMPLS switches that receive a path establishment request, or may be connected to all or appropriate ones of the GMPLS switches.

As a protocol according to which the communication path establishment request system 71 requests establishment of a PSC-LSP in the packet network 1, the telnet (IETF RFC854 standard) that is used to issue a command, the RSVP-TE, the User Network Interface (UNI) 1.0 signaling specifications (O-UNI) standardized by the Optical Internetworking Forum, or any other signaling protocol, the HTTP (IETF RFC1945 standard), the SIP (IETF RFC2543 standard), RTSP (IETF RFC2326 standard), or any other application protocol, the SOAP version 1.2 standardized by the World Wide Web Consortium, the CORBA™/IIOP™ specifications standardized by the Object Management Group, or any other remote procedure call protocol can be adopted.

When the communication path establishment request system 71 requests establishment of the PSC-LSP 34, the packet switching device A11, packet-TDM linkage switching device A13, packet-TDM linkage switching device B14, and packet switching device B12 transmit or receive a message, which conforms to a signaling protocol (for example, the GMPLS RSVP-TE extensions), to or from one another so as to update the states of the packet switching units therein. Thus, the PSC-LSP 34 is established. A route to be followed by the PSC-LSP 34, that is, the GMPL switching units and interface units through which the PSC-LSP 34 passes as well as adaptation may be explicitly designated by the communication path establishment system 71. Alternatively, the GMPLS switches may query the path calculation device, whereby the switching units and interface units as well as adaptation may be determined. In the latter case, the communication path establishment request system 71 requests establishment of a path with a service identifier and a service attribute appended to the request. The GMPLS switches interchange the designated service identifier and service attribute according to the signaling protocol. If necessary, the GMPLS switches each transmit a path calculation request, which contains the service identifier and service attribute, to the path calculation device. Based on the service identifier and service attribute, the path calculation device determines the route and adaptation and returns them to the GMPLS switch, and thus controls the route of the PSC-LSP 34 and the adaptation.

Likewise, when the communication path establishment request system 71 requests establishment of the PSC-LSP 35, the packet switching device A11, packet-TDM linkage switching device C16, packet-TDM linkage switching device D17, and packet switching device B12 transmit or receive a message, which conforms to a signaling protocol, to or from one another so as to update the states of the packet switching units in the respective switching devices. Thus, the PSC-LSP 35 is established. If necessary, each of the GMPLS switches transmits a path calculation request, which contains a service identifier and a service attribute, to the path calculation device. Based on the service identifier and service attribute, the path calculation device determines the route and adaptation, returns them to the GMPLS switch, and thus controls the route of the PSC-LSP 34 and the adaptation.

The packet switching devices A11 and B12, packet-TDM linkage switching devices A13 and B14, and TDM switching device E15 transmit or receive a message, which conforms to the GMPLS OSPF-TE extension that is one of routing protocols, so as to learn the topology of the network. The message conformable to the GMPLS OSPF-TE extension is transferred via the control information transfer device A41 and/or control information transfer device B42.

Under the GMPLS, user data and a signaling protocol may not be transferred along the same route. In the present embodiment, for example, the user data on the PSC-LSP 34 is transmitted via the packet switching device A11, packet-TDM linkage switching devices A13 and B14, and packet switching device B12 (communication interfaces 11b, 11d, 13b, 13d, 14d, 14b, 12d, and 12b). In contrast, a message conformable to the GMPLS RSVP-TE extension or GMPLS OSPF-TE extension is transferred via the control information transfer device A41 and/or control information transfer device B42.

In addition, the message conformable to the GMPLS RSVP-TE extension or GMPLS OSPF-TE extension may be encapsulated based on a tunneling protocol such as the Generic Routing Encapsulation (IETF RFC2784 standard) or the like.

The control information transfer device A41 and control information transfer device B42 are devices having a packet transfer facility, such as, Internet Protocol (IP) routers or MAC bridges conformable to the IEEE 802.3d standard.

2. GMPLS Switch (Node)

Next, the hardware configuration of each GMPLS switch and the actions therein will be described below.

FIG. 4 is a block diagram showing the packet interface units 11a to 11d.

The packet interface units 11a to 11d each include an optical receiver 401, a received packet header analysis block 402, a transmission packet header production block 403, an optical transmitter 404, and a packet layer failure management block 405.

The optical receiver 401 receives a light signal from any other GMPLS switch, decodes the light signal into packet data, and transmits the packet data to the received packet header analysis block 402. The received packet header analysis block 402 produces internal transfer destination information, which can be interpreted by a packet switching unit 112, on the basis of a header in the received packet, and transmits the information to the packet switching unit 112.

Based on information on packet cross-connection determined by transferring a GMPLS RSVP-TE message, the packet switching unit 112 determines an interface unit to which a packet should be transmitted, and transfers the packet to the determined interface unit.

The packet to be transferred is passed from the packet switching unit 112 to the transmission packet header production block 403. The transmission packet header production block 403 produces a header needed to transfer the packet to a device that terminates the next hop, and transmits the information to the packet interface unit in an adjoining GMPLS switch in the form of a light signal via the optical transmitter 404.

Based on an instruction sent from the control unit 111, the packet layer failure management block 405 diagnosis whether a failure is present in a packet layer, and notifies the control unit 111 of information on presence or absence of the failure. A unit in which presence or absence of the failure is diagnosed is an established PSC-LSP, a packet link, or a signal in a lower-level layer.

As a means for diagnosing whether a failure is present, a passive inspection method based on a power loss in a light signal or frame out of synchronization, such as, a code inspection method based on a cyclic redundancy check (CRC), or an active inspection method based on transfer of a failure detection signal, such as, the Ethernet (registered trademark)-Operations, Administration and Maintenance (OAM) method (ITU-T Y.1731 standard, IEEE 802.1ag standard) or the MPLS-OAM method (ITU-T, Y.1711 standard), or the Internet Control Message Protocol (ICMP) (IETF RFC0792 standard) can be adopted.

The received packet header analysis block 402 and transmission packet header production block 403 may perform inter-network adaptation processing such as packet encapsulation processing, traffic flow separation/integration, QoS mapping, alarm transfer processing, or code conversion. The adaptation processing is also controlled based on an instruction sent from the control unit 111.

As for packet encapsulation processing, the MPLS Label Stack Encoding (IETF RFC3032 standard), Pseudowire Emulation Edge to Edge (PWE3) (IETF RFC3985 standard), and Generic Framing Procedure (GFP) (ITU-T, G.7041 standard) are conceivable.

As for QoS processing, mapping of a Differentiated Services Code Point (DSCP) stipulated in the Differentiated Services and Tunnels (Diffserve) (IETF RFC2983 standard) and a priority value stipulated in the IEEE 802.1D standard, determination of the DSCP based on a traffic according to the A Two Rate Three Color Marker (TrTCM) (IETF RFC2698 standard), selective discarding of a packet based on a header defined in any of Layers 2 to 7, and selective discarding of a packet based on the Reverse Path Forwarding (uRPF) are conceivable.

As for traffic flow separation/integration processing, path protection for a transmission path stipulated in the Optical Transport Network (OTN), Synchronous Digital Hierarchy (SDH), or MPLS, virtual concatenation stipulated in the Virtual Concatenation (VCAT) (ITU-T G.783 standard) and the Link Capacity Adjustment Scheme (LCAS) (ITU-T G.7042 standard), link aggregation, and policy routing based on a header in any of Layers 2 to 7 are conceivable.

As for alarm transfer processing, failure information stipulated in the Ethernet (registered trademark)-OAM may be newly issued with a failure alarm, which is detected based on the MPLS-OAM, as a trigger.

As for code conversion processing, insertion of an error correcting code, protocol conversion, data compression/decompression, and transcoding of a media stream are conceivable.

The constitution of the packet interface units in the packet switching device B12 and packet-TDM linkage switching devices A13 and B14, and the actions to be performed therein are identical to those of the packet interface units 11a to 11d.

Figure 5:
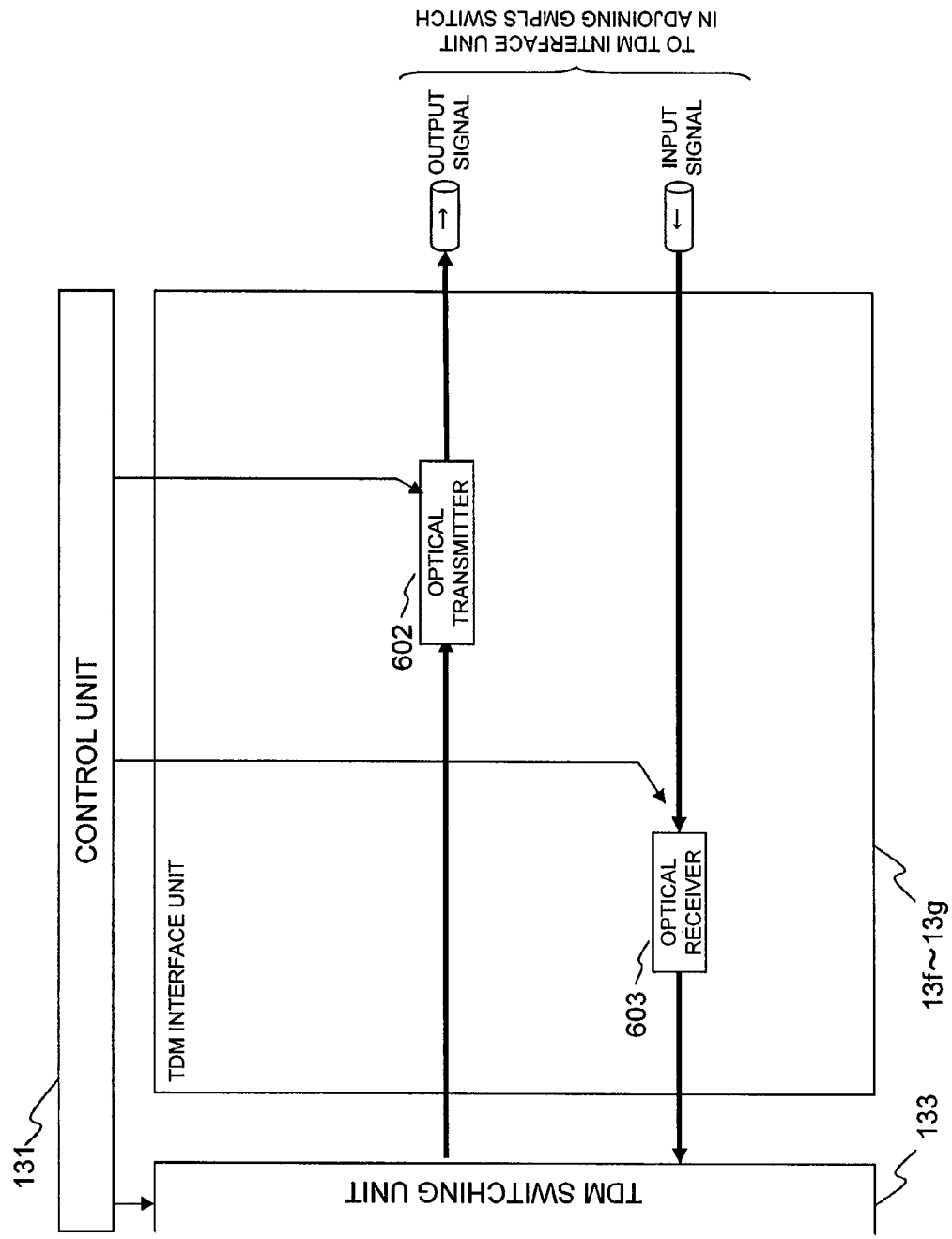
FIG. 5 is a block diagram showing a TDM interface unit.

FIG. 5 is a block diagram showing the constitution of the TDM interface units 15a and 15b in the TDM switching device E15 and the actions to be performed therein.

The TDM interface units 15a and 15b each include an optical transmitter 602 and an optical receiver 603.

The optical transmitter 602 transmits a time-division multiplexed signal, which is received from the TDM interface unit in the adjoining TDM switching device or packet-TDM linkage switching device, to the TDM interface unit in the adjoining GMPLS switch while placing the signal in a light signal. The optical receiver 603 receives the light signal from the TDM interface unit in the adjoining GMPLS switch, and passes the light signal to the TDM switching unit 133.

The TDM switching unit 133 determines an interface unit, to which the signal should be transmitted, on the basis of information on TDM cross-connection which is determined through transfer of a GMPLS RSVP-TE message, and transfers the signal to the determined interface unit.

Figure 6:
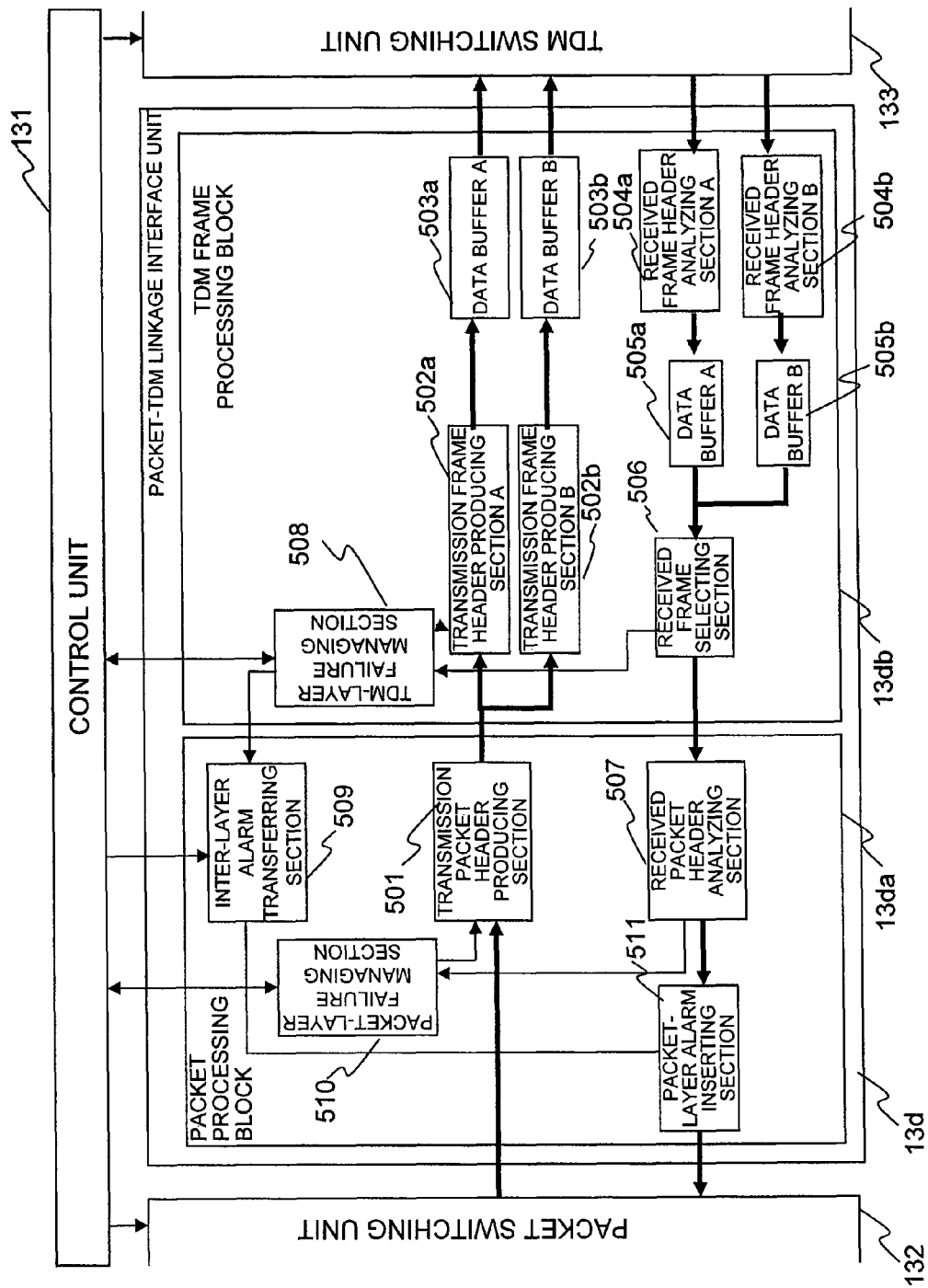
FIG. 6 is a block diagram showing a packet-TDM linkage interface unit.

FIG. 6 is a block diagram showing the constitution of the packet-TDM linkage interface unit 13d in the packet-TDM linkage switching device A13, and actions to be performed therein. The packet-TDM linkage interface unit 13d, packet-TDM linkage interface unit 14d, packet-TDM linkage interface unit 14d, packet-TDM linkage interface unit 16d, and packet-TDM linkage interface unit 17d have the same constitution and performs the same actions.

The packet-TDM linkage interface unit 13d includes a packet processing block 13da and a TDM frame processing block 13db.

The packet processing block 13da includes a transmission packet header producing section 501, a received packet header analyzing section 507, an inter-layer alarm transferring section 509, a packet-layer failure managing section 510, and a packet-layer alarm inserting section 511.

The TDM frame processing block 13db includes a transmission frame header producing section A502a, a transmission frame header producing section G502b, a data buffer A503a, a data buffer B503b, a received frame header analyzing section A504a, a received frame header analyzing section B504b, a data buffer A505a, a data buffer B505b, a received frame selecting section 506, and a TDM-layer failure managing section 508.

Next, the constitution of the control unit 111 included in the packet switching device A11 and actions to be performed therein will be described below.

Figure 7:
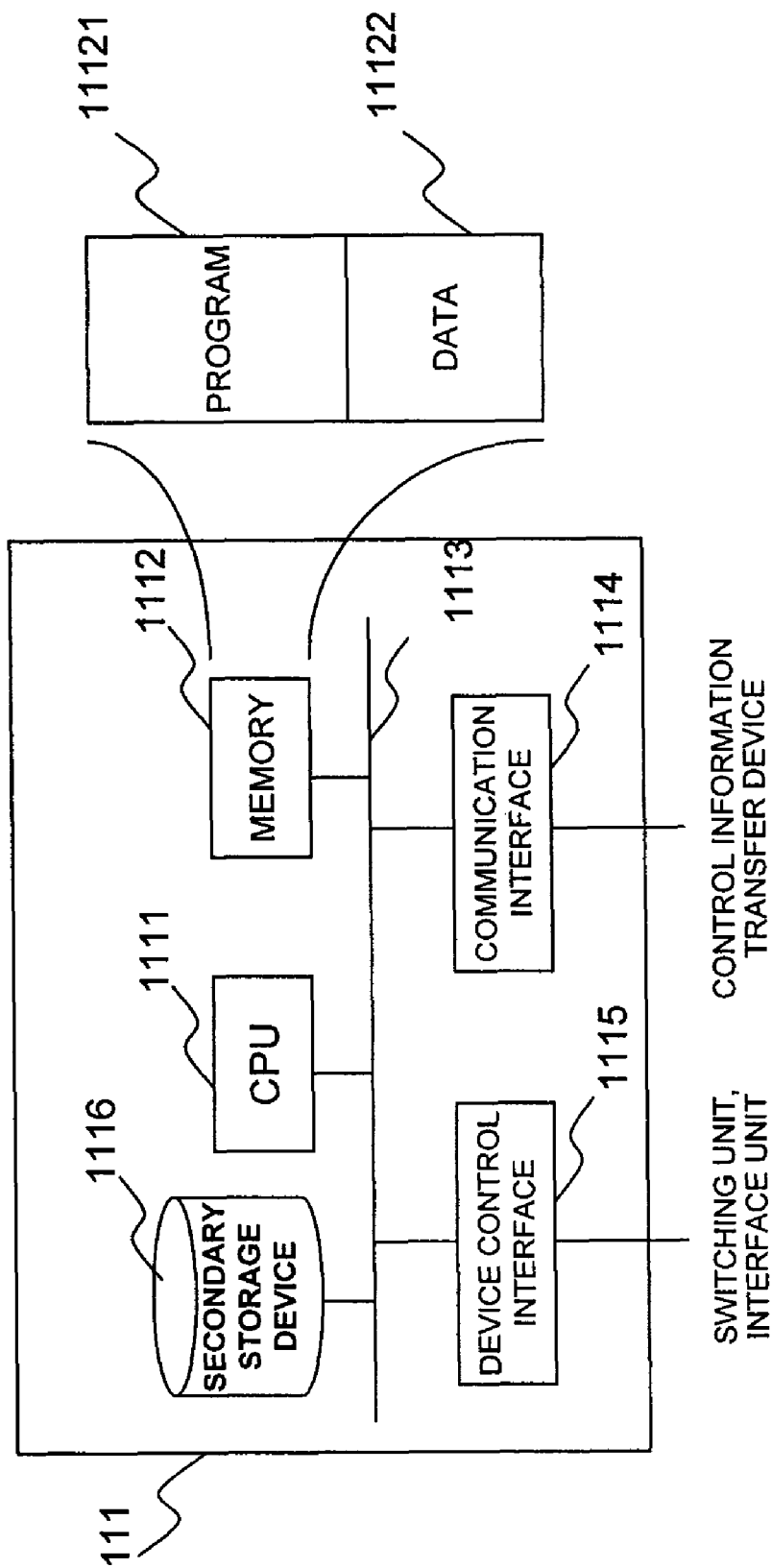
FIG. 7 is a block diagram showing a control unit included in a packet switching device and a path calculation device.

FIG. 7 is a block diagram showing the control unit 111 in each of the packet switching devices A11 and B12.

The control unit 111 includes a CPU 1111, a memory 1112, an internal communication path 1113 such as a bus, a communication interface 1114, a device control interface 1115, and a secondary storage device 1116.

The communication interface 1114 is connected to the control information transfer device, and transfers a GMPLS RSVP-TE message to or from the other GMPLS switches. The device control interface 1115 is connected to the packet switching unit and packet interface unit, and controls the units. In the memory 1112, a program 11121 and data 11122 are stored if necessary.

The control unit 121 in the packet switching device B12 is identical to the control unit 111.

The control unit in the TDM switching device E15 is identical to the control unit 111. However, the interface unit and switching unit to which the control unit is connected are the TDM interface unit and TDM switching unit.

The control units in the packet-TDM linkage switching devices A13 and B14 are identical to the control unit 111. However, the interface units to which the control units are connected are the packet interface unit and TDM interface unit respectively, and the switching units to which the control units are connected are the packet switching unit and TDM switching unit respectively.

3. Message Format

Figure 8A:
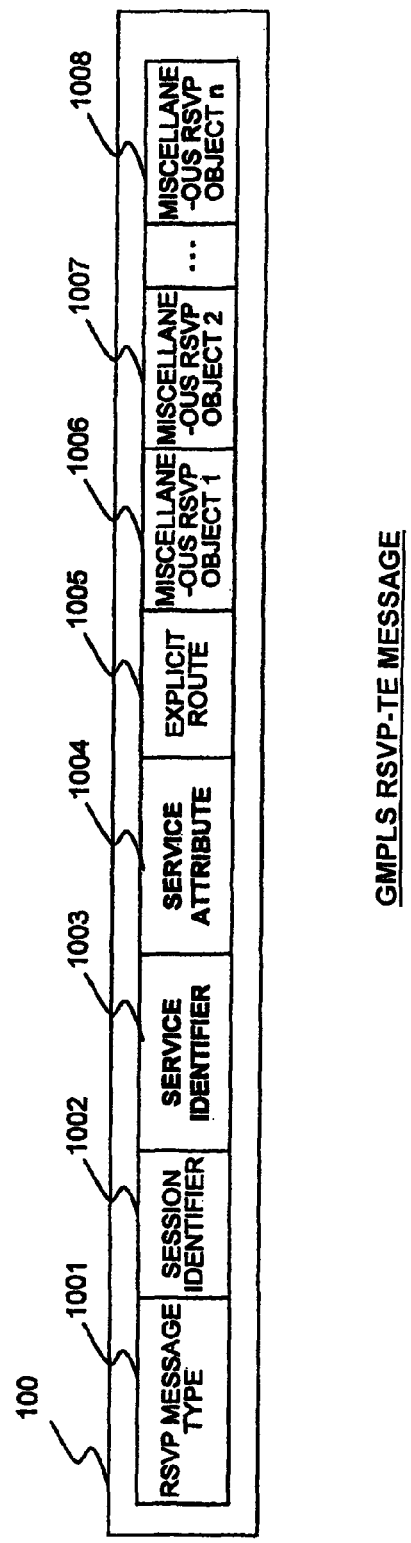
FIG. 8A is a format diagram showing the contents of a GMPLS RSVP-TE message 100 to be transferred between GMPLS switches.

FIG. 8A is a format diagram showing the contents of a GMPLS RSVP-TE message 100 to be transferred among the GMPLS switches.

The GMPLS RSVP-TE message 100 contains an RSVP message type 1001, a session identifier 1002, a service identifier 1003, a service attribute 1004, an explicit route 1005, a miscellaneous RSVP object 1_1006, a miscellaneous RSVP object 2_1007, and a miscellaneous RSVP object n1008.

The RSVP message type 1001, session identifier 1002, and explicit route 1005 are objects based on the RSVP standard.

The GMPLS RSVP-TE message 100 falls into a PATH message that serves as a path establishment request and a RESV message that serves as a path establishment response and a resource assignment. The RSVP message type 1001 indicates either of the types. The session identifier 1002 is an identifier with which a communication path to be established based on the GMPLS (label switched path (LSP)) is identified. The explicit route 1005 is an object which an upstream GMPLS switch uses to designate a point through which the communication path to be established should pass.

The service identifier 1003 and service attribute 1004 are objects introduced in the present embodiment, and indicate the type of service to be provided over the path to be established, and the attribute that is inherent to each service and characterizes the detail of the service.

The miscellaneous RSVP objects 1_1006, 2_1007, and n1008 are miscellaneous objects based on the RSVP standard.

Figure 8B:
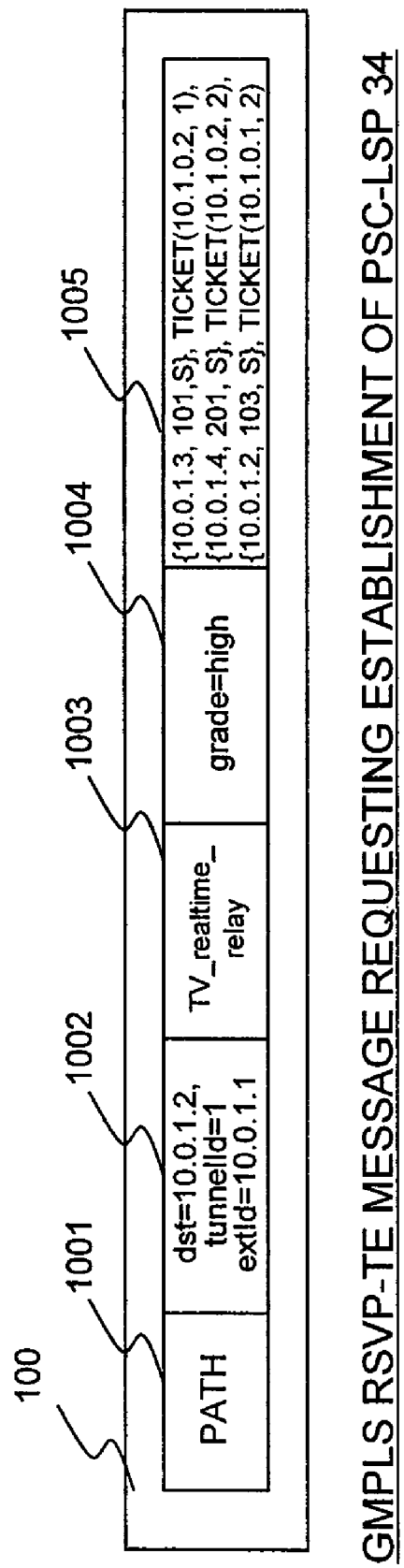
FIG. 8B is a diagram showing the concrete contents of a path request message to be issued by a packet switching device A11 in order to establish a PSC-LSP 34.

FIG. 8B shows a path request message which the packet switching device A11 issues to the packet-TDM linkage switching device A13 in the case of establishing the PSC-LSP 34.

Since the path request message is a path establishment request, PATH is specified as the RSVP message type 1001. Since router identifiers for a source node and a terminal node are 10.0.1.2 and 10.0.1.1, assuming that the session identifier is 1002, "dst=10.0.1.2, tunnelId=1, extId=10.0.1.1" is recorded based on the GMPLS standards.

The service identifier 1003 and service attribute 1004 signify that a real-time television broadcasting service is provided and a service grade is high.

The explicit route 1005 indicates a route which a path should follow. As the value, a route 1722 contained in a response returned from the packet-layer path calculation device A81 is recorded. Although the explicit route 1005 is an RSVP object conformable to the GMPLS standards, ticket sub-objects are added as elements characteristic to the present embodiment. The ticket sub-object is determined by the path calculation device and represents a tag that is independent of an adaptation type and assigned to information on adaptation determined by the path calculation device. The ticket sub-object is described in the form of ticket (xxx,yyy). The identifier of a path calculation device that has issued a ticket is specified in the part xxx, and a ticket identifier unique in the issuance-source path calculation device is specified in the part yyy. Incidentally, the ticket sub-object is equivalent to, for example, an adaptation ticket.

A method according to which the path calculation device determines the route 1722 will be described in conjunction with FIG. 10 and FIG. 17.

Figure 8C:
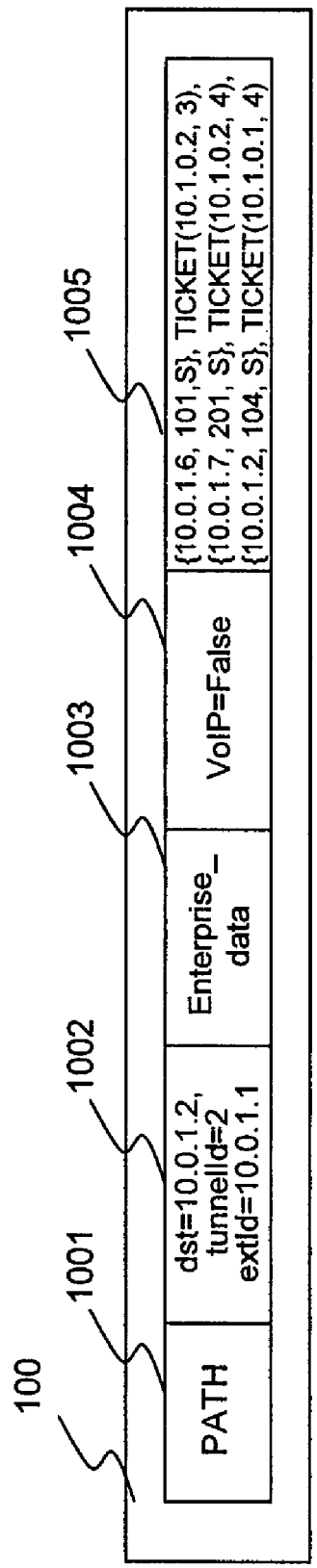
FIG. 8C is a diagram showing the concrete contents of a path request message to be issued by the packet switching device A11 in order to establish a PSC-LSP 35.

FIG. 8C shows the contents of a path request message which the packet switching device A11 issues to the packet-TDM linkage switching device A13 in the case of establishing the PSC-LSP 35. The path request message signifies that the PSC-LSP 35 is used to provide an enterprise-oriented service and that the Voice over Internet Protocol (VoIP) technology is not employed.

Figure 9A:
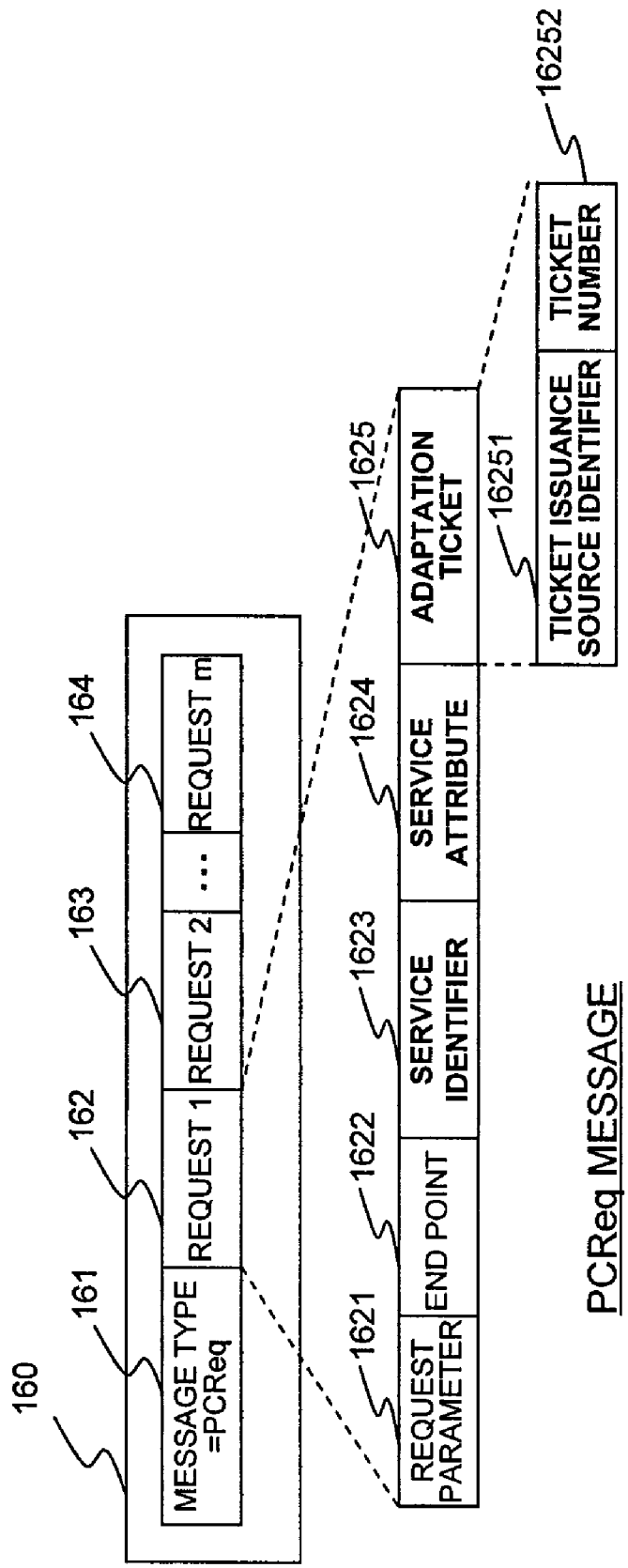
FIG. 9A is a format diagram showing the contents of a request message to be issued when a GMPLS switch requests a path calculation device to perform path calculation or when the path calculation device requests another path calculation device to perform path calculation.

FIG. 9A shows the format of a PCReq message that is a message to be sent when the control unit 111 in the packet switching device A11 requests the packet-layer path calculation device A81 to perform path calculation. The PCReq message 160 contains a request type 161 and a request 1_162, and may also contain requests 2_163 to m164. The request 1_162 contains a request parameter 1621, an end point 1622, a service identifier 1623, a service attribute 1624, and an adaptation ticket 1625. The same applies to the requests 2_163 to m164.

The same applies to the format of a message to be sent when any other packet switching device, packet-TDM linkage switching device, or TDM switching device issues a request to the packet-layer path calculation device A81 or TDM-layer path calculation device A82.

Figure 9B:
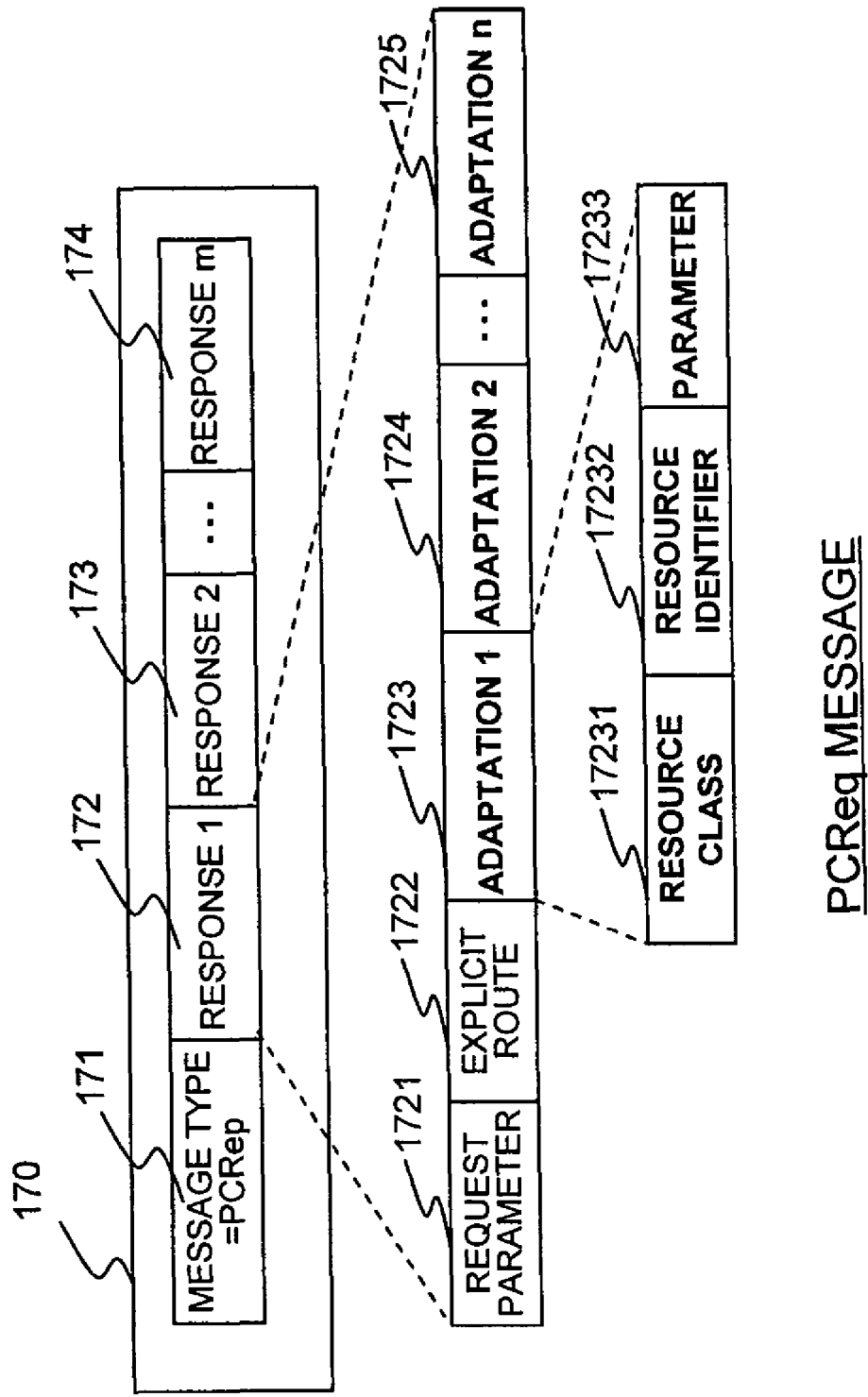
FIG. 9B is a format diagram showing the contents of a response message which the path calculation device uses to return a result of path calculation to the GMPLS switch or path calculation device that is a path calculation request source.

FIG. 9B shows the format of a PCReq message that is a message to be sent when the packet-layer path calculation device A81 returns a result of path calculation to the control unit 111 in the packet switching device A11. The PCRep message 170 contains a message type 171 and a response 1_172, and may further contain responses 2_173 to m174. The response 1_172 contains a request parameter 1721, a route 1722, adaptation 1_1723, adaptation 2_1724, and adaptation n1725. The same applies to the responses 2_173 to m174. The adaptation 1723 may contain, for example, a resource class 17231, a resource identifier 17232, and a parameter 17233.

4. Software Configuration (Path Calculation Device)

Figure 10:
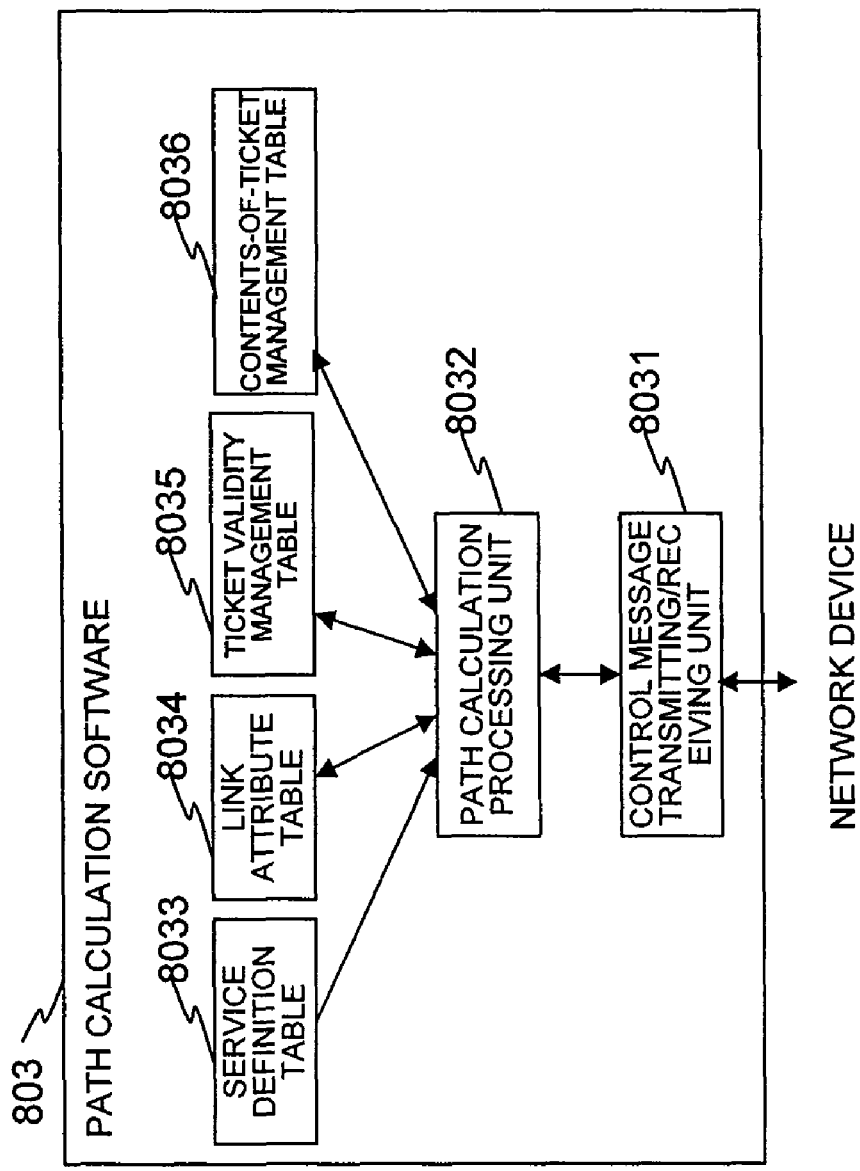
FIG. 10 is a diagram showing the software configuration of a path calculation device.

FIG. 10 is a diagram showing the software configuration of each of the packet-layer path calculation device A81 and TDM-layer path calculation device A82.

In path calculation software 803, when receiving the PCReq message 160 that is a path calculation request, a control message transmitting/receiving unit 8031 decodes the PCReq message 160. A path calculation processing unit 8032 uses a service definition table 8033 and a link attribute table 8034 to determine a route of a path and adaptation. The control message transmitting/receiving unit 8031 constructs the PCRep message 170 and returns the message to a request source.

If the path calculation request source is the path calculation device, an adaptation ticket that is a tag assigned to adaptation information is determined instead of the adaptation itself, and returned as the PCRep message 170. The relationship of association between the adaptation ticket and adaptation is recorded in a contents-of-ticket management table 8036. In addition, a valid period of the ticket is determined, and a ticket validity management table 8035 is used to manage whether the ticket is valid or invalid.

When determining a route of a path, the path calculation processing unit 8032 uses the service definition table 8033 to determine a requirement for maintenance of the communication path on the basis of the service identifier 1623 and service attribute 1624 contained in the PCReq message 160, extracts all the links, which satisfy the requirement for maintenance of the communication path, from among all the links registered in the link attribute table 8034, and determines the route in a network, which is formed with the extracted link group, by applying a route search algorithm such as the Shortest Path First.

For the details of the processing to be performed by the path calculation processing unit 8032, a description will be made later in conjunction with FIG. 17.

(GMPLS Switch)

Figure 11:
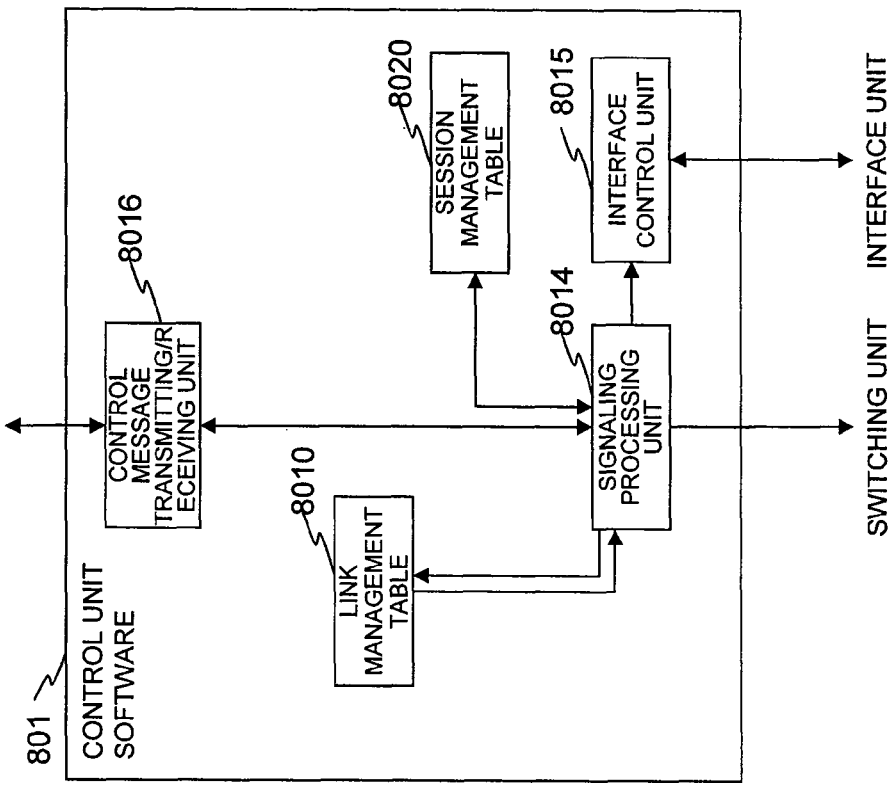
FIG. 11 is a diagram showing the software configuration of a control unit in a GMPLS switch.

FIG. 11 is a diagram showing the software configuration of the control unit 111. The other GMPLS switches have the same software configuration.

A signaling processing unit 8014 transfers a GMPLS RSVP-TE message to or from the other GMPLS switches via a control message transmitting/receiving unit 8016. The signaling processing unit 8014 receives a path establishment request sent from the communication path establishment request system 71.

When having received the path establishment request from the communication path establishment request system 71 via the control message transmitting/receiving unit 8016, or when having received a PATH message from the upstream GMPLS switch, the signaling processing unit 8014 records the contents of the receive message in a session management table 8020.

The contents of the explicit route 1005 are checked. If the second sub-object specified in the field of the explicit route 1005 indicates an interface in an adjoining node, the PATH message is transferred to the node including the indicated interface according to the GMPLS standards. If the second sub-object does not indicate the interface in the adjoining node, the path calculation device is requested to perform path calculation.

If the second sub-object is a ticket, a request for provision of adaptation information associated with the ticket is transmitted as a path calculation request to the path calculation device that is a ticket issuance source specified in the ticket. If the second sub-object is not a ticket, a default path calculation device is requested to perform path calculation. The path calculation request contains an identifier of an own node as the end point 1622, contains a path end point, and further contains the service identifier 1003 and service attribute 1004, which are specified in the PATH message, as the service identifier 1623 and service attribute 1624 to be specified in a PCReq message.

When a path calculation response is received from the path calculation device, the route 1722 specified in a PCRep message is recorded as the explicit route 13016 in the session management table 8020. Thereafter, the PATH message is transferred to a downstream node according to the GMPLS standards.

When having received a RESV message from the downstream GMPLS switch, the signaling processing unit 8014 constructs a cross-connection designation value on the basis of link information recorded in the session management table 8020, and sets the value in a switching unit. Based on the adaptation information recorded in the session management table 8020, an interface unit is designated.

For the details of processing to be performed by the signaling processing unit 8014, a description will be made later in conjunction with FIG. 18 and FIG. 19.

5. Table
(Path Calculation Device)

Tables included in the path calculation device will be described below.

FIG. 13A and FIG. 13B are diagrams showing the construction of the service definition table 8033.

The service definition table 8033 has the fields of a condition for a service identifier 1101, a condition for a service attribute 1102, a requirement for maintenance 1103, and adaptation information 1104.

To each row in the service definition table, the if-then rule is applied in order to determine the requirement for maintenance 1103 and adaptation 1104 on the basis of a received path establishment request.

The path calculation processing unit 8032 assesses the service identifier 1623 and service attribute 1624, which are contained in a received path calculation request, to see if the service identifier and service attribute satisfy the condition for a service identifier 1101 and the condition for a service attribute 1102 which are specified on each row. If the service identifier and service attribute satisfy the respective conditions, the values of the requirement for maintenance 1103 and adaptation 1104, which are specified on the same row, are adopted as the requirement for maintenance of a communication path and adaptation.

For example, the service identifier 1003 and service attribute 1004 contained in a path establishment message concerning the PSC-LSP 34 shown in FIG. 8B satisfy the conditions specified on the third row in the service definition table 8033 shown in FIG. 13A. Therefore, the requirement for maintenance of the communication path is "max_fail_time<100 msec, maintenance_time_must_be_in "0:00-5:00"." This signifies that the service discontinuation time should fall within 100 ms and the maintenance time zone "must_be_in", that is, should be a zone from 0:00 to 5:00. Likewise, the adaptation is described as "PSC.toGbeAlarm_forwarder.guardTime=50 msec."

Likewise, as for the PSC-LSP 35, since the values shown in FIG. 8C satisfy the conditions specified on the second row in the service definition table 8033 shown in FIG. 13A, the values of the requirement for maintenance 1103 and adaptation 1104 specified on the same row are adopted.

FIG. 14A is a diagram showing the construction of the link attribute table 8034 preserved by the packet-layer path calculation device A81.

The link attribute table 8034 has fields of a switching capability 1401, a running attribute 1402, a link-end A router identifier A14031, a link-end A interface identifier A14032, a link-end B router identifier B14041, a link-end B interface identifier 14042, and a link maintenance attribute 1405.

The link attribute table 8034 preserved by the packet-layer path calculation device A81 holds the constructions and attributes of all links in the packet layer, and expresses as a whole a network topology in the packet layer.

Figure 14B:
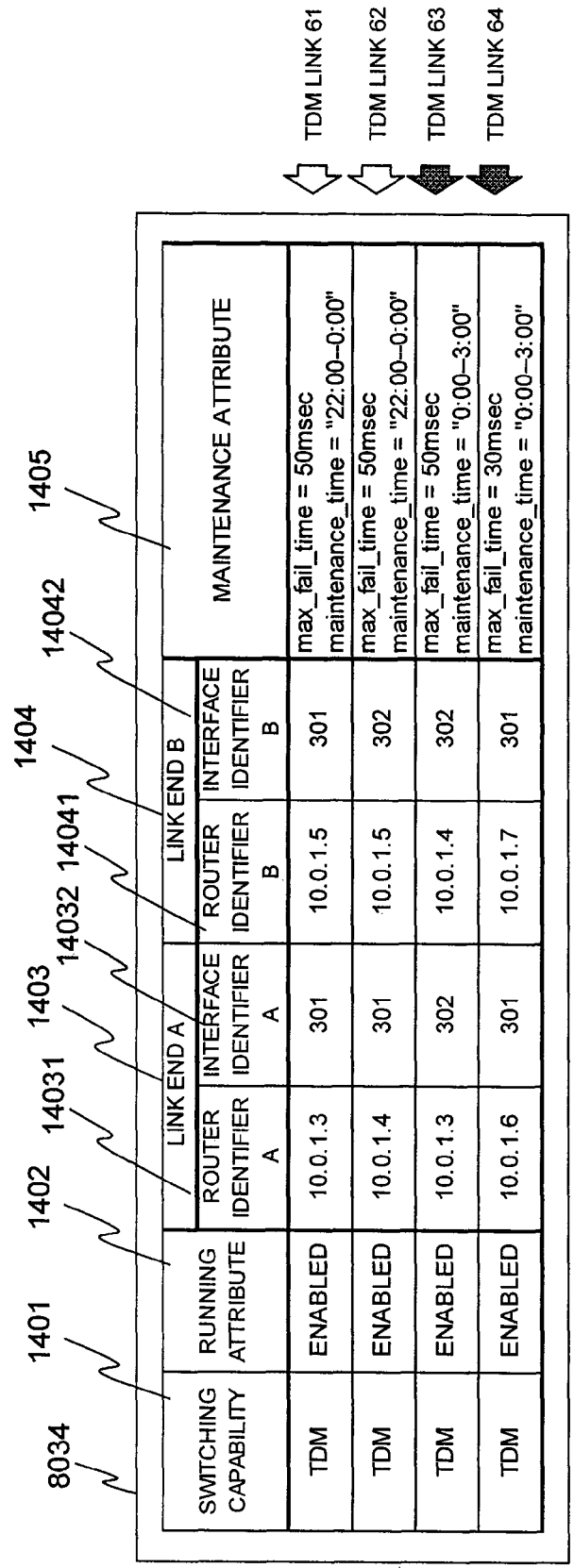
FIG. 14B is a diagram showing the construction of a link attribute table 8034 (TDM layer path calculation device A) preserved by the path calculation device.

FIG. 14B is a diagram showing the construction of the link attribute table 8034 preserved by the TDM-layer path calculation device A82.

The link attribute table 8034 preserved by the TDM-layer path calculation device A82 holds the constructions and attributes of all links in the TDM layer, and expresses as a whole a network topology in the packet layer.

FIG. 20A and FIG. 20B are diagrams showing the construction of the ticket validity management table 8035. The ticket validity management table 8035 has fields of a ticket number 80351 and a validity timer 80352. The value of the validity timer 80352 is automatically decremented along with the passage of time.

FIG. 21A and FIG. 21B are diagrams showing the construction of the contents-of-ticket management table 8036. The contents-of-ticket management table 8036 has fields of a ticket number 80361, a resource class 80362, a resource identifier 80363, and a parameter 80364.

(GMPLS Switch)

The tables included in each GMPLS switch will be described below.

Figure 15:
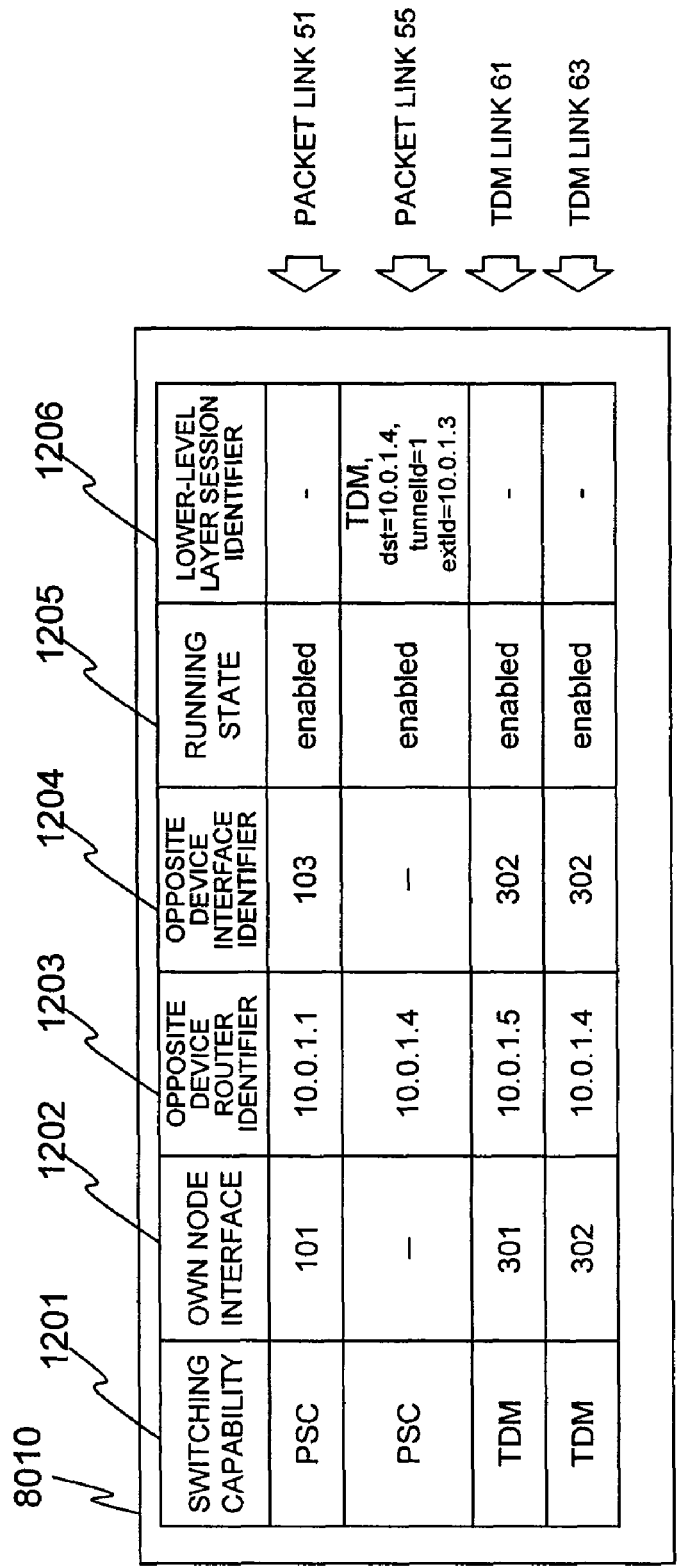
FIG. 15 is a diagram showing the construction of a link management table 8010 preserved by a GMPLS switch.

FIG. 15 is a diagram showing the construction of the link management table 8010.

The link management table 8010 has fields of a switching capability 1201, an own node interface 1202, an opposite device router identifier 1203, an opposite device interface identifier 1204, a running state 1205, and a lower-level layer session identifier 1206.

Among rows in the link management table 8010, rows having PSC specified in the field of the switching capability 1201 each signify one packet link, and rows having TDM specified in the field of the switching capability 1201 each signify one TDM link.

The values in FIG. 15 are concerned with the packet-TDM linkage switching device A13.

A row having the field of the lower-level layer session identifier 1206 left blank signifies an LSP whose lower-level layer is not controlled under the GMPLS.

A row having TDM alone specified in the field of the lower-level layer session identifier 1206 signifies that a TDM-LSP can be established but has not been established. A row having TDM and a session identifier specified in the field of the lower-level layer session identifier 1206 signifies that the TDM-LSP has already been established.

FIG. 16A and FIG. 16B are diagrams showing the construction of the session management table 8020.

The session management table 8020 has fields of RSVP information 1301 and adaptation information 1302.

The RSVP information 1301 is divided into a session identifier 130011, a previous hop 13012, a subsequent hop 13013, a service identifier 13014, a service attribute 13015, an explicit route 13016, and miscellaneous RSVP objects 13017 and 13018.

The values in FIG. 16A are concerned with the packet switching device A11. The first and second rows refer to the PSC-LSP 34 and PSC-LSP 35 respectively.

The values in FIG. 16B are concerned with the packet-TDM linkage switching device A13. The first row refers to the PSC-LSP 34.

The IF_ID value in the field of the subsequent hop is not specified in the field of the explicit router 1005 in a path establishment request message received from a device terminating a previous hop. A value determined through route determination processing performed by the signaling processing unit 8014 is specified.

As for the PSC-LSP 34, an adaptation action value determined through adaptation determination processing performed by the signaling processing unit 8014 is specified in the field of the adaptation information 1302.

When packet switching units are designated based on the values of the previous hop 13012, subsequent hop 13013, and a label, a communication path is established. As for the handling of the label, since the handling has no difference from that stipulated in the GMPLS standards, a description will be omitted.

As for the PSC-LSP 34, the value of the adaptation information 1302 is set in a packet interface unit, and a failure alarm in the TDM layer is transferred to the packet layer.

6. Processing (Communication Path Establishment Control)

Figure 12A:
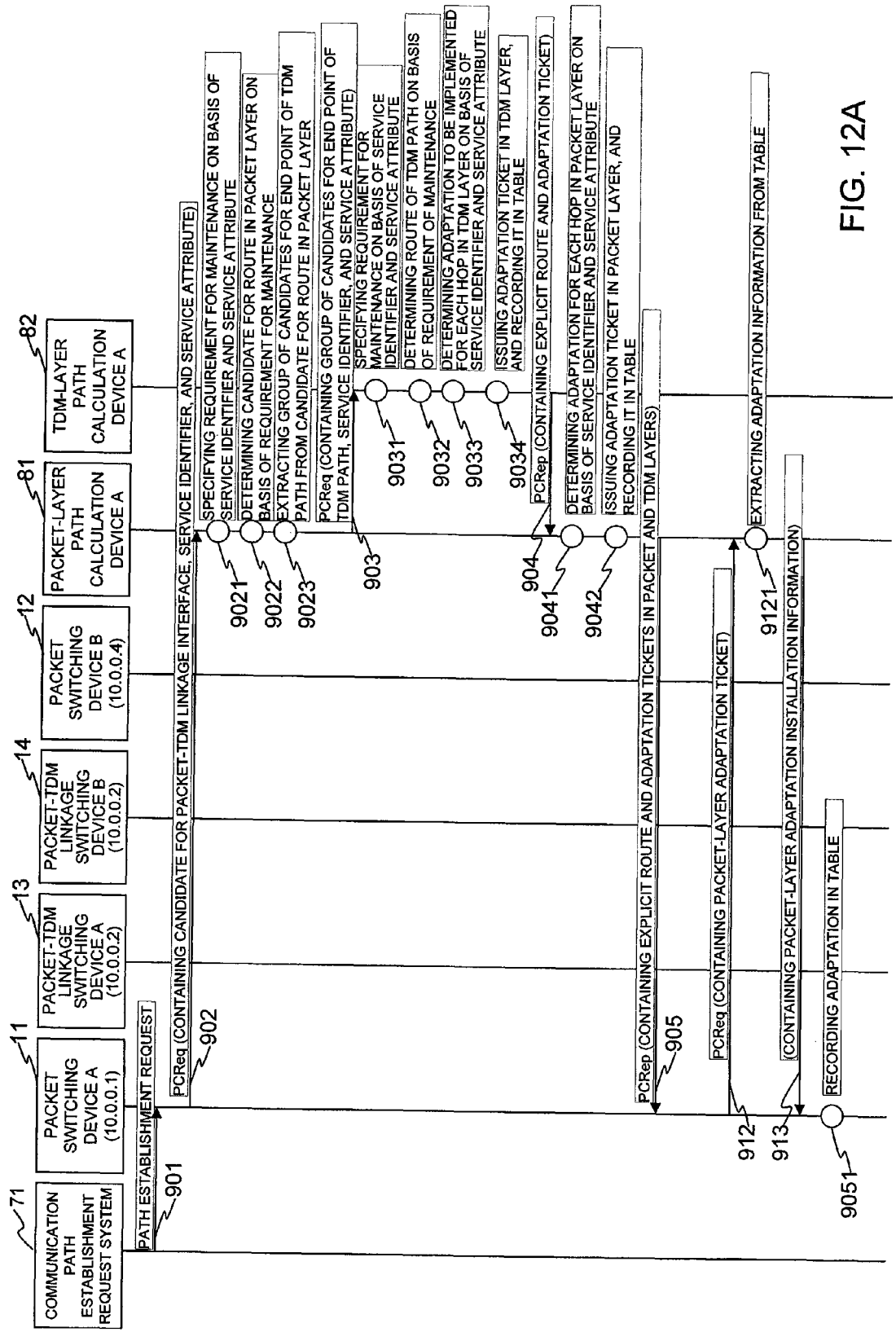
FIG. 12A is a sequence diagram (1) to be applied to establishment of a communication path.
Figure 12B:
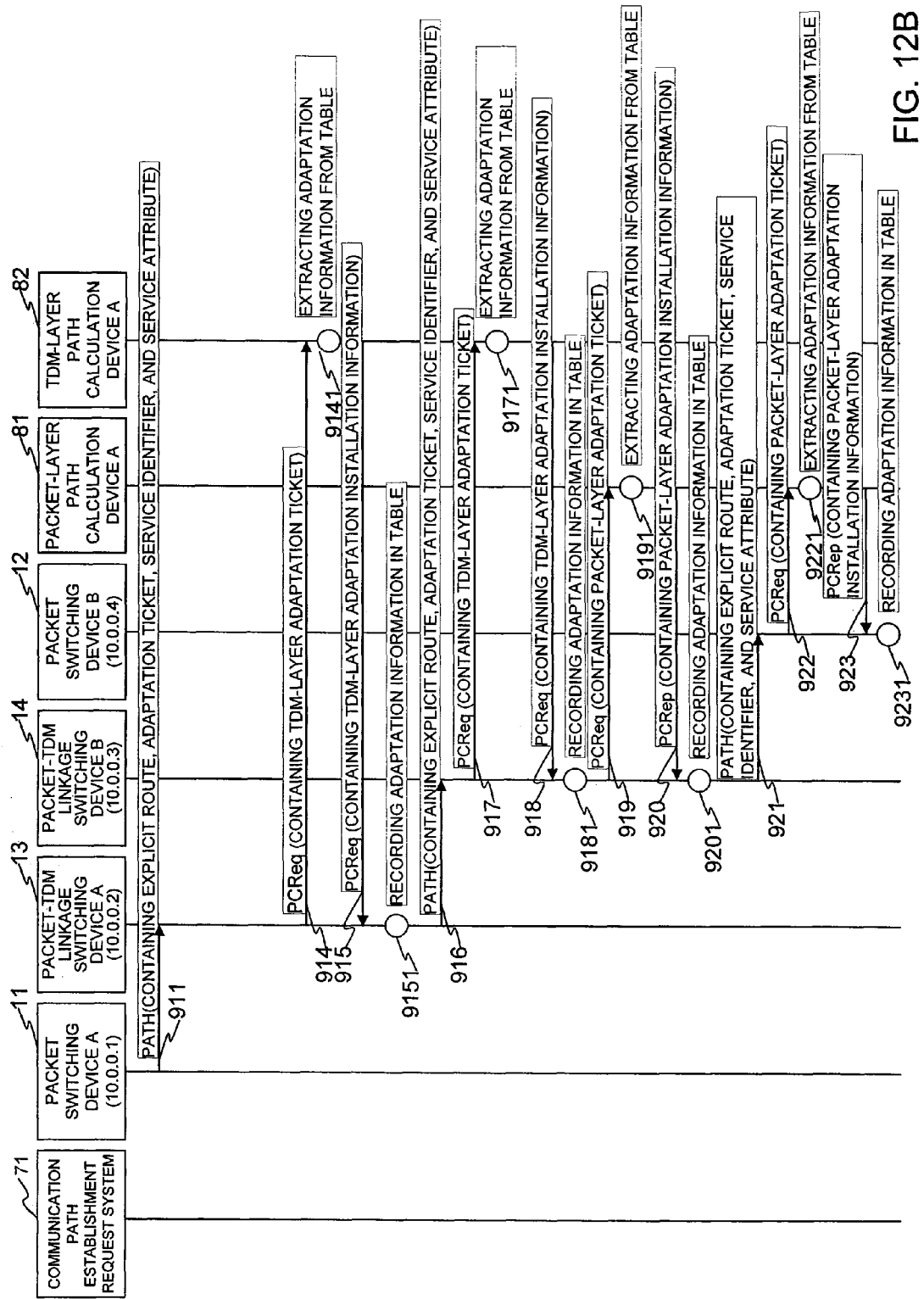
FIG. 12B is a sequence diagram (2) to be applied to the establishment of a communication path.
Figure 12C:
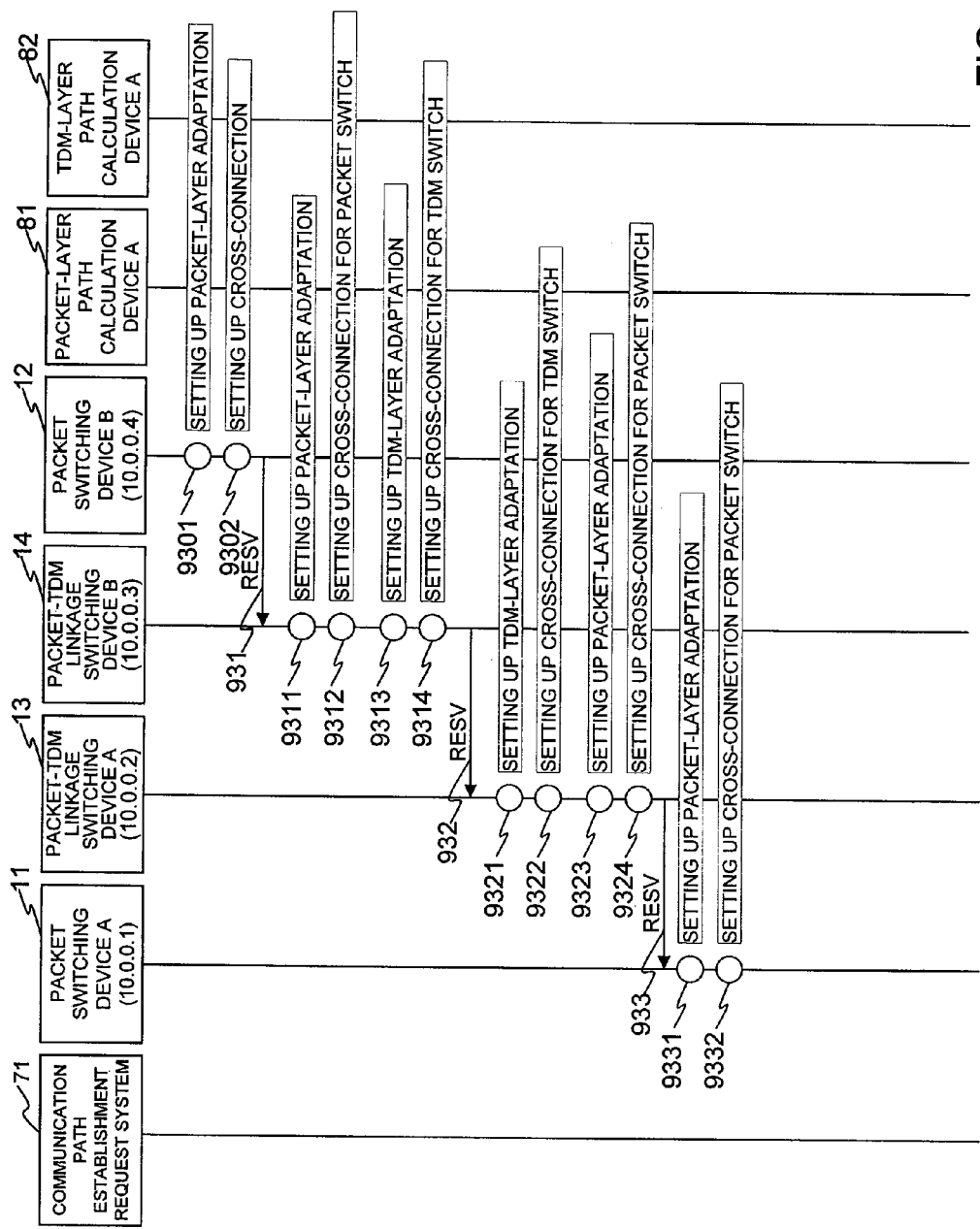
FIG. 12C is a sequence diagram (3) to be applied to the establishment of a communication path.

FIG. 12A to FIG. 12C are sequence diagrams presenting a GMPLS RSVP-TE message which is transferred among the GMPLS switches at the time of establishing a communication path, path calculation request and response messages which are transferred between each GMPLS switch and the path calculation device, and a sequence of pieces of processing to be performed by the control unit in each GMPLS switch.

When the packet switching device A11 receives a path establishment request issued from the communication path establishment request system 71 (901), the packet switching device A11 transmits a received path calculation request (PCReq), to which a service identifier and a service attribute are appended, to the packet-layer path calculation device A81 (902). Based on the received service identifier and service attribute, the packet-layer path calculation device A81 references the service definition table 8033 so as to determine a requirement for maintenance which links for hops of a communication path to be established (PSC-LSP) should satisfy (9021).

Thereafter, links that satisfy the requirement for maintenance are extracted from the link attribute table 8034. A candidate for a route of a communication path that satisfy the requirement for maintenance in relation of each hop is determined by applying a route search algorithm such as the Shortest Path First to a network composed of the extracted links (9022). Multiple candidates may be determined as the candidate for a route.

Assuming that the determined candidate for the route includes a server-layer path, that is, a link for any of the hops following the candidate for the route should be formed with a TDM-LSP that is defined in the server layer, the end point of the link is regarded as the end point of the TDM-LSP (9023). A path calculation request (PCReq) is transmitted to the TDM-layer path calculation device A82. The service identifier and service attribute are appended to the path calculation request (903).

The TDM-layer path calculation device A82 references, similarly to the packet-layer path calculation device A81, the service definition table 8033 so as to determine a requirement for maintenance which links for the hops of a communication path (TDM-LSP) to be established should satisfy (9031). The TDM-layer path calculation device A82 references the link attribute table 8034 so as to determine a candidate for a route of the TDM-LSP which satisfies the requirement for maintenance in relation to each hop (9032). Thereafter, the TDM-layer path calculation device A82 searches the service definition table 8033 on the basis of the service identifier and service attribute so as to determine adaptation to be implemented at the end point of the TDM-LSP (9033). If the request source is the path calculation device, a ticket number is assigned to the determined adaptation (9034), and the route and adaptation are returned to the request source in the form of a PCRep message (904).

Thereafter, the packet-layer path calculation device A81 searches the service definition table 8033 on the basis of the service identifier and service attribute so as to determine adaptation to be implemented at the end point of the PSC-LSP (9041), issues an adaptation ticket, and records the adaptation ticket in the contents-of-ticket management table (9042). The identifiers of interfaces existing along the route, the adaptation ticket of the adaptation to be implemented at the end point of the PSC-LSP, and the adaptation ticket of the adaptation to be implemented at the end point of the TDM-LSP are specified in the object of the explicit route 1722 in the order in which the interfaces and end points appear on the communication path to be established. The resultant message is returned as a PCRep message to the request source (905).

The packet switching device A11 regards the received object of the explicit route 1722 as, the object of the explicit route 1005 in the GMPLS extended RSVP-TE message received from an adjoining node, and interprets the explicit route.

Under the GMPLS RSVP-TE extensions, the GMPLS switch having received the PATH message (herein, the packet switching device A11) interprets sub-objects from the leading one, controls the own node along with the progress of the interpretation, and transfers an object of an explicit route, from which sub-objects indicating resources in the own node are removed, to a device that terminates the next hop (according to, for example, a node identifier specified in the explicit route). In the present embodiment, the object of the explicit route may contain a ticket sub-object that is an element characteristic of the present invention. When sub-objects are interpreted from the leading one, if the ticket sub-object appears, a path calculation request is issued to the path calculation device identified with a ticket issuance source identifier 16251 contained in the ticket sub-object. An adaptation ticket is contained in the path calculation request.

In the example shown in FIG. 12A to FIG. 12C, the ticket sub-object is contained in the object of the explicit route received at step 905. Therefore, the path calculation request containing the adaptation ticket is issued to the packet-layer path calculation device A81 identified with the ticket issuance source identifier 16251 (912).

The path calculation device having received the path calculation request that contains the adaptation ticket fetches adaptation information, which is preserved at the time of issuance of the adaptation ticket, from the contents-of-ticket management table (9121), and returns it to the request source (913).

The packet switching device A11 records the received adaptation information in the session management table in association with an RSVP session (9051).

Thereafter, the packet switching device A11 transmits the PATH message to the packet-TDM linkage switching device A13 on the basis of the GMPLS RSVP standard (according to, for example, a node identifier of a node specified as a node that terminates the next hop along the explicit route) (914). However, the point that the PATH message contains the service identifier, service attribute, and adaptation ticket is the feature of the present invention different from the RSVP standard.

The packet-TDM linkage switching device A13 sequentially interprets, similarly to the packet switching device A11, the object of the explicit route 1005. Since the adaptation ticket appears, the packet-TDM linkage switching device A13 issues a path calculation request (914). The TDM-layer path calculation device A82 fetches, similarly to the packet-layer path calculation device A81, adaptation information from the table (9141), and returns the information to the request source (915). The returned adaptation information is recorded in the session management table in association with an RSVP session (9151).

Thereafter, the PATH message is transferred to the packet-TDM linkage switching device B14 and packet switching device B12 in that order (916, and 921). If necessary, a query is transmitted to the path calculation device, and a response is returned (917, 9171, 918, 919, 9191, 929, 922, 9221, and 923). Session information and adaptation information are preserved in each node (9181, 9201, and 9231).

Since the packet switching device B12 is located at a path end point, the sequence returns to processing of a RESV message stipulated in the GMPLS RSVP-TE extensions.

The packet switching device B12 fetches adaptation information, and sets up adaptation and cross-connection in the interface unit and switching unit thereof respectively (9301 and 9302).

Thereafter, based on the actions stipulated in the GMPLS RSVP-TE standard, the RESV message is transferred to the device terminating the previous hop (931, 932, and 933). The other GMPLS switches existing along the route also set up the adaptation and cross-connection in the interface units and switching units thereof respectively (9311 to 9314, 9321 to 9324, 9331, and 9332).

(Path Calculation Device)

Figure 17:
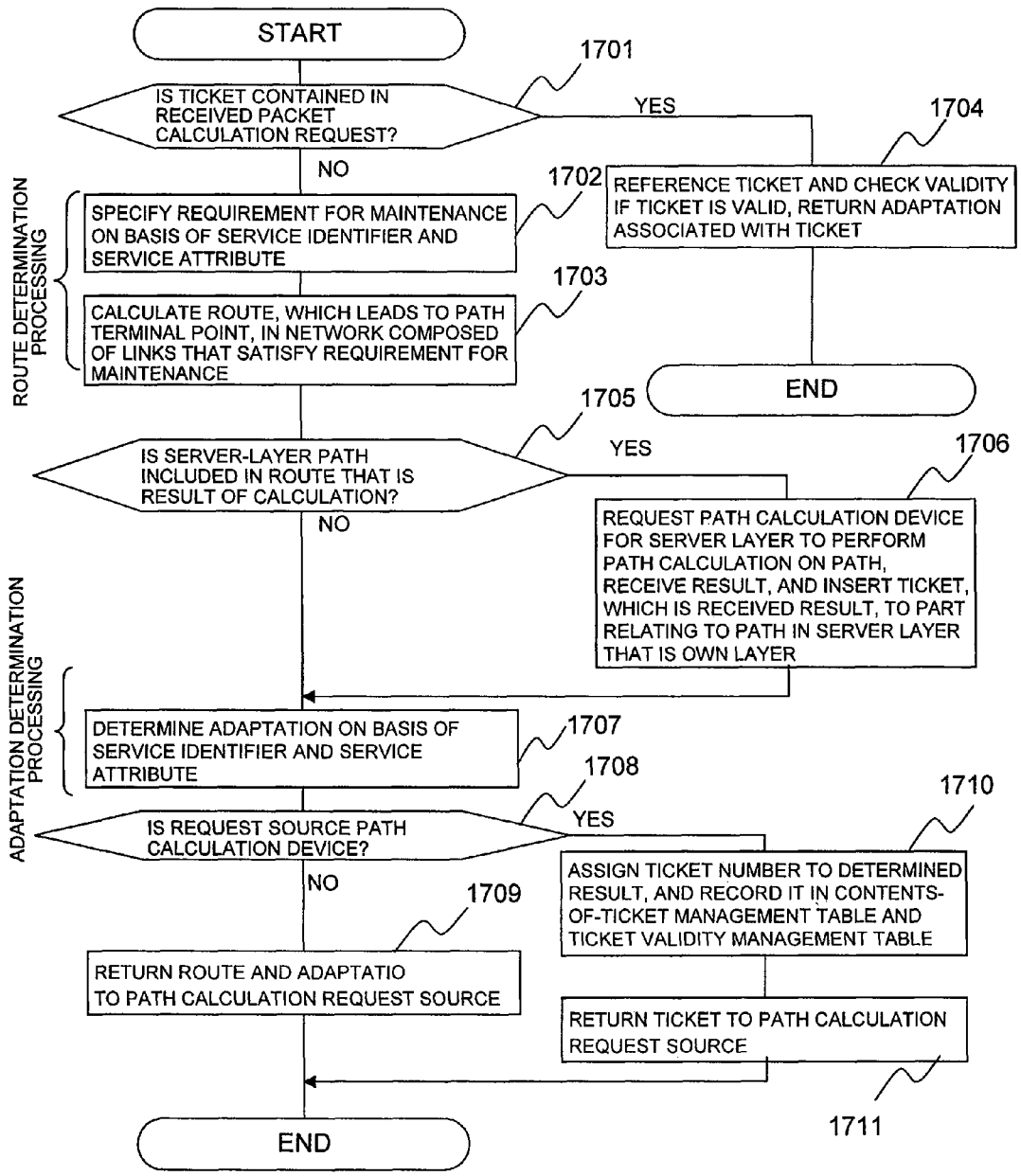
FIG. 17 is a flowchart describing actions to be performed in a path calculation device on receipt of a PCReq message.

FIG. 17 is a flowchart describing processing to be performed by the path calculation processing unit 8032 when the path calculation software 803 has received a path calculation request (PCReq message).

When the path calculation software 803 receives the path calculation request (PCReq message), whether the adaptation ticket 1625 is contained in the received PCReq message is decided (1701). If the adaptation ticket 1625 is contained, the validity of the ticket is decided based on whether an entry whose ticket number squares with the ticket number 16525 contained in the adaptation ticket 1625 is present in the ticket validity management table 8035 and whether the validity timer 80352 of the entry takes on a positive value. If the ticket is valid, all entries whose ticket numbers 80361 square with the ticket number 16252 of the adaptation ticket 1625 are selected from the contents-of-ticket management table 8036, and recorded in the field of adaptation in a PCRep message. The response is then returned to the request source (1704).

If the adaptation ticket 1625 is not contained in the received PCReq message, the service definition table 8033 is searched based on the service identifier 1623 and service attribute 1624 in order to retrieve the requirement for maintenance 1103 (1702). All entries whose maintenance attributes 1405 satisfy the requirement for maintenance 1103 are selected from the link attribute table 8034. A network formed by a link group (for example, a link terminal A and a link terminal B) indicated by the selected entries is regarded as an object, and a route ending at a path terminal is calculated using a route calculation algorithm such as the SPF (1703).

A link for each hop of the deduced result is checked to see if it includes a server-layer path (TDM-LSP in case an object of calculation is defined in the packet layer) (1705). If the link includes the server-layer path, the server-layer path calculation device is requested to perform path calculation in relation to the server-layer path. The path calculation request PCReq takes over the service identifier 1623 and service attribute 1624 contained in the PCReq message which the path calculation processing unit has received. In addition, the ends of the link are passed as the end points 1622. When a path calculation response (PCRep) is received from the server-layer path calculation device, the adaptation ticket 1625 contained in the received response PCRep is inserted to part of the result, which is deduced at step 1703, relating to an associated hop (1706).

Thereafter, adaptation to be implemented at the end point of the path which the path calculation processing unit is currently calculating is determined based on the service identifier 1623 and service attribute 1624. For determination of adaptation, an entry in the service definition table 8033 of which service identifier and service attribute square with the service identifier 1623 and service attribute 1624 is selected, and the adaptation 1104 recorded in the selected entry is adopted (1707).

Thereafter, if the request source is the path calculation device (1708), a ticket number is assigned to the determined adaptation, and registered in the ticket validity management table 8035 and contents-of-ticket management table 8036 (1710). The route deduced at step 1703 and the adaptation ticket are returned in the form of a PCRep message to the request source (1711).

If the request source is not the path calculation device but a network device, the route deduced at step 1703 and the adaptation deduced at step 1707 are returned in the form of the PCRep message to the request source (1709).

(GMPLS Switch)

Figure 18:
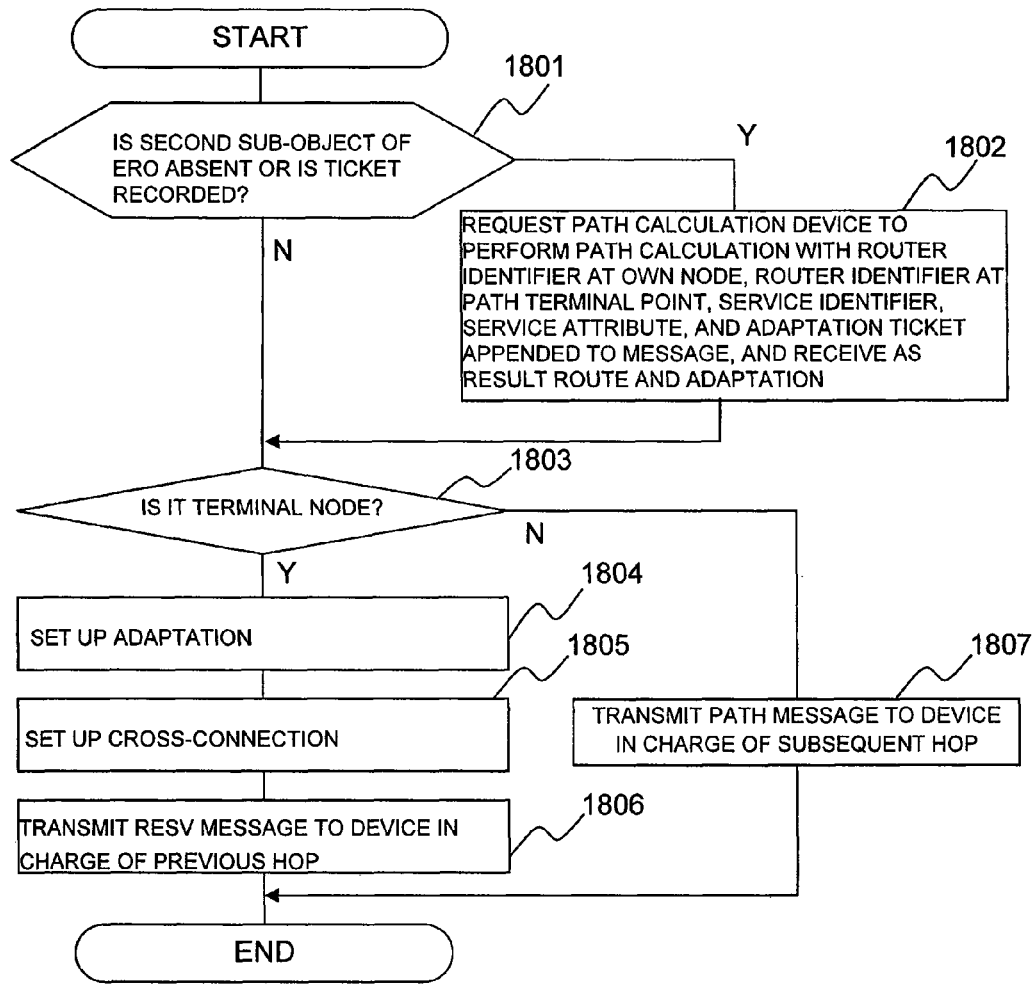
FIG. 18 is a flowchart describing actions to be performed in a GMPLS switch on receipt of a Path message.

FIG. 18 is a flowchart describing actions to be performed when the signaling processing unit 8014 has received a PATH message (path establishment request).

When the PATH message is received, whether the second sub-object of the explicit route 1005 is not found (only one sub-object) or whether the second sub-object is a ticket is decided (1801).

If the statement is true, the default path calculation device is requested to perform path calculation. The service identifier 1003 and service attribute 1004 in the PATH message are recorded as the service identifier 1623 and service attribute 1624 respectively in a PCReq message. If the second sub-object of the explicit route 1005 is the ticket, the ticket is specified as the adaptation ticket 1625 in the PCReq message. When a PCRep message that is a path calculation response is received from the path calculation device, a route and adaptation are fetched from the message and recorded as the explicit route 13016 and adaptation information 1302 in the session management table 8020 (1802).

If the own node is a terminal node of a communication path whose establishment is requested with the received PATH message (1803), the adaptation recorded in the session management table 8020 at step 1802 is set up in the interface unit (1804), and cross-connection is set up in the switching unit (1805). At this time, information on an upstream link and label values of upstream and downstream links are needed. Since the resolving methods are identical to those stipulated in the GMPLS RSVP-TE standard, a description will be omitted. An RESV message is produced based on the GMPLS RSVP-TE standard, and transferred upstream (1806).

If a decision is made at step 1803 that the own node is not the end point of the communication path whose establishment is requested with the received PATH message, that is, if the own node is an intermediate node existing along the route, the PATH message is transmitted to the device terminating the next hop (1807). Since a method of determining the PATH message to be transferred is identical to that stipulated in the GMPLS RSVP-TE standard, a description will be omitted. As for the service identifier 1003 and service attribute 1004, those received from the upstream switching device are appended to the PATH message, which is transferred to the downstream switching device, as they are.

Figure 19:
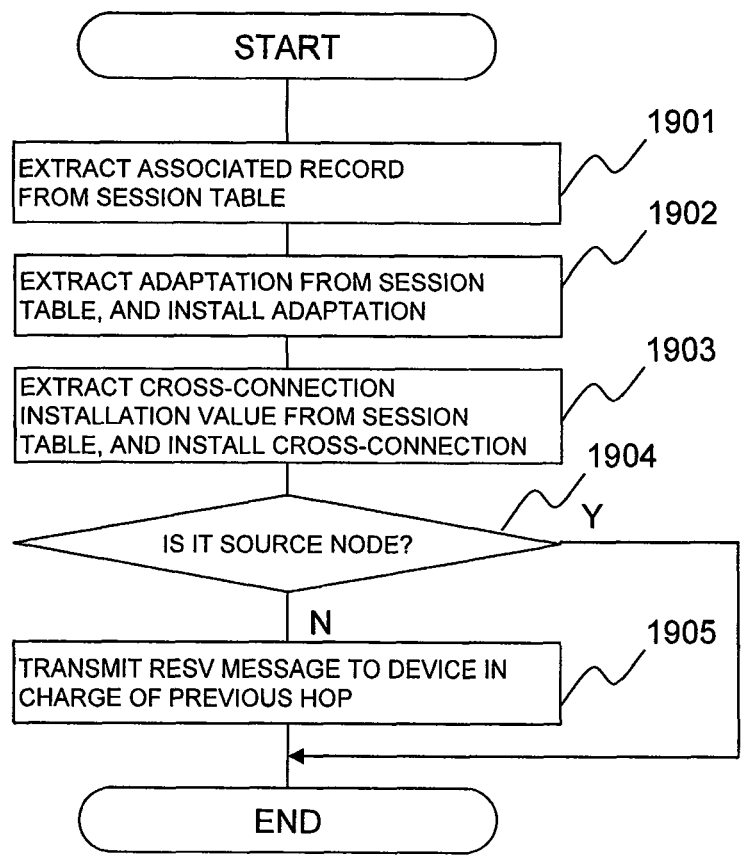
FIG. 19 is a flowchart describing actions to be performed in a GMPLS switch on receipt of a RESV message.

FIG. 19 is a flowchart describing actions to be performed when the signaling processing unit 8014 has received an RESV message.

When the RESV message is received, the session identifier 1002 contained in the received message is used to search the session management table 8020 (1901), and adaptation is retrieved and set up in the interface unit (1902). Likewise, subsequent-hop link information is fetched, and cross-connection is set up in the switching unit (1903). These pieces of processing are identical to those performed at step 1805.

Thereafter, whether the own node is the source node of a communication path whose establishment is request is decided (1904). If the own node is not the source node, the RESV message is transferred to the device, which terminates the previous hop, according to the GMPLS RSVP-TE standard.

If the own node is the source node, the communication path is established.

7. Postscript

As described so far, the communication path establishment request system 71 places a service type and an attribute inherent to each service in a message conformable to a signaling protocol, and posts the pieces of information to the GMPLS switches through which a communication path passes. Each of the GMPLS switches decides a requirement for maintenance on the basis of the posted pieces of information, and determines a relationship of accommodation and adaptation on the basis of the result of the decision. Thus, information needed to control the relationship of accommodation and information needed to identify adaptation can be controlled in relation to each communication path but may not be transferred between management systems independently of control of establishment of a communication path.

When the relationship of accommodation and adaptation are determined based on a service discontinuation permissible time that is a kind of requirement for maintenance of a service, if multiple communication paths share network resources including interfaces, an event that maintenance cannot be achieved because of a difference in a service discontinuation permissible time zone among the communication paths can be prevented.

In the present embodiment, each GMPLS switch executes route determination processing and adaptation determination processing during a sequence of transferring a message conformable to the signaling protocol. These pieces of processing may be executed by the communication path establishment request system 71.

In this case, the route determination processing and adaptation determination processing which each GMPLS switch executes by transferring the signaling-protocol message to or from the other GMPLS switches are virtually executed by the communication path establishment request system 71. Determined resources to be allocated and determined adaptation are set up in the switching unit and interface unit respectively in each node using a management protocol such as the SNMP, CORBA, netconf, or telnet instead of the signaling protocol. According to the present embodiment, path control can be implemented according to a requirement for maintenance in a network that does not include a signaling mechanism.

The present invention can be applied to a network system in which an established communication path is used for communication. Especially, the present invention is preferably applied to a GMPLS or MPLS network in which an LSP is established based on the GMPLS or MPLS signaling protocol or the MPLS RSVP-TE.

What is claimed is:

1. A communication network system comprising:
   a plurality of nodes; and
   a first path calculation device;
   the first path calculation device includes:
   a service definition table that includes a plurality of correspondence information of a service identifier, a service attribute, a requirement for maintenance of a communication path, and adaptation information in association with one another, a link attribute table that includes a plurality of correspondence information of a link identifier of a link and a maintenance attribute of the link in association with each other;

at least one of the plurality of nodes include:

a session management table that includes a plurality of correspondence information of a session identifier, a service identifier, a service attribute, an explicit route, and adaptation information in association with one another;

wherein:

one of the plurality of nodes serving as an origin of the communication path transmits a path calculation request, which contains a service identifier and a service attribute, to the first path calculation device;

the first path calculation device:

determines a requirement for maintenance of the communication path, which links for hops of the communication path to be established should satisfy, on the basis of the service definition table and the service identifier and service attribute included in the path calculation request;

extracts a plurality of links, of which maintenance attributes of the link satisfy the determined requirement for maintenance, from the link attribute table based on the determined requirement for maintenance and the maintenance attributes of the link in the link attribute table, determines a candidate for a route of the communication path, which satisfies the requirement for maintenance of the communication path in relation to each of the hops, in a network formed with the extracted plurality of links, determines the adaptation information, which is about any of various connection facilities to be implemented at the end point of the communication path, by searching the service definition table on the basis of the service identifier and service attribute within the path calculation, and sends a path calculation response, which contains the determined candidate for the route and/or the adaptation information, to the first node of the one of the plurality of nodes;

if the received path calculation response contains the adaptation information, the one of the plurality of nodes records the adaptation information, which is contained in the received path calculation response, in the session management table in association with the service identifier, service attribute, and explicit route; and the one of the plurality of nodes sets up an adaptation facility for itself on the basis of the adaptation information contained in the path calculation response received from the first path calculation device, and transmits a path establishment request, which contains the service identifier, service attribute, and explicit route, to other one of the plurality of nodes terminating the subsequent hop.

2. The communication network system according to claim 1, wherein the path calculation device inserts the determined adaptation information to the explicit route, and designates a network resource, which is an object in which the determined adaptation should be set up, according to part of the explicit route to which the adaptation information is inserted.

3. The communication network system according to claim 1, wherein a path establishment request is transferred among nodes connected to one another by links identified based on the explicit route, a query or a response is, if necessary, transferred to or from the first or a second path calculation device, and session information and adaptation information are held in each node.

4. The communication network system according to claim 1, wherein the first node at an origin includes means that requests path establishment with the identifier of a service to be provided and the attribute thereof contained in a message serving as a path establishment request.

5. The communication network system according to claim 1, wherein a third node at a path end point obtains adaptation information contained in a path calculation response, sets up adaptation and cross-connection in an interface unit and switching unit respectively, and transfers a path establishment response message to a node terminating the previous hop.

6. The communication network system according to claim 1, wherein, when having received a path establishment response from a downstream node, each node designates an interface unit on the basis of adaptation information recorded in the session management table.

7. The communication network system according to claim 1, wherein:

when a link for any of hops forming a determined candidate for a route should be realized with a path defined in a server layer, the first path calculation device transmits a path calculation request, which contains the end point of the link as the end point of the path and contains the service identifier and service attribute, to a second path calculation device for the server layer; and the second path calculation device uses, similarly to the first path calculation device, the service definition table to determine a requirement for maintenance which links for hops of a communication path to be established should satisfy, uses the link attribute table to determine a path that satisfies the requirement for maintenance in relation to each of the hops, and searches the service definition table on the basis of the service identifier and service attribute so as to determine adaptation information to be set at the end point of the path.

8. The communication network system according to claim 1, wherein the first path calculation device comprising:

means that determines a requirement for maintenance of a communication path and/or adaptation by assessing the identifier of a service contained in a received path establishment request and/or an attribute inherent to the service, means that holds maintenance attributes of network resources including nodes and links among the nodes, and means that compares the maintenance attributes of the network resources with the requirement for maintenance of the communication path so as to select links and nodes, which satisfy the requirement for maintenance, over an end-to-end interval for which path calculation has been requested, thus determines a route of the path, and returns the determined path route and adaptation to the request source.

9. The communication network system according to claim 1, wherein:

the first path calculation device further includes:

a contents-of-ticket management table in which the relationship of association between an adaptation ticket and adaptation is recorded, means that assigns an adaptation ticket, which is a tag independent of the type of adaptation, to the adaptation information, and holds the relationship of association between the adaptation and adaptation ticket, means that returns the adaptation ticket instead of the response representing adaptation, and means that, when the path calculation request contains the adaptation ticket, returns the associated adaptation;

each node includes:

means that requests path establishment to an adjoining downstream node by inserting an explicit route to a path establishment request, the explicit route which is contained in a path calculation response received from the path calculation device and contains the adaptation ticket, and means that interprets the explicit route, which is contained in the received path establishment request, from the beginning, that if the adaptation ticket appears, issues another path calculation request, which contains the adaptation ticket, to the first path calculation device identified with a path calculation device identifier contained as a ticket issuance source in the adaptation ticket; and when having received the path calculation request that contains the adaptation ticket, the first path calculation device obtains the adaptation information, which is preserved at the time of issuance of the adaptation ticket, from the contents-of-ticket management table, and returns a path calculation response, which contains the adaptation information and explicit route, to the first node of the request source.

10. The communication network system according to claim 9, wherein the first path calculation device includes means that when assigning the adaptation ticket, designates the valid period of the adaptation ticket, and that, when the valid period is expired, invalidates the adaptation ticket.

11. The communication network system according to claim 1, wherein the first path calculation device includes means that requests a second path calculation device to determine a detailed route of a path and/or adaptation in relation to a portion of an interval for which path calculation has been requested, receives a response, and produces a response to a path calculation request, which the own path calculation device has received, by inserting the route and/or adaptation information, which are contained in the received response, to a part of the route of the path and adaptation information, which are determined by the own path calculation device, relating to the portion of the interval.

12. The communication network system according to claim 1, wherein an adaptation facility represented by the adaptation information includes one or more of an encapsulation function, a function of distributing a flow or integrating portions of a flow, and a function of selectively transferring a management alarm, which are applied to data to be transferred from the node.

13. The communication network system according to claim 1, wherein an adaptation facility represented by the adaptation information includes a QoS mapping function and/or a code conversion function, which are applied to data to be transferred from the node.

14. The communication network system according to claim 1, wherein the requirement for maintenance of the communication path and the maintenance attributes of the network resources each include information on a time zone during which a service should be provided, and/or information on the length of a time during which discontinuation of a service is permitted.

15. The communication network system according to claim 1, wherein the path establishment request or path establishment response is an MPLS or GMPLS RSVP extension message.

16. A communication path establishment control method in a communication network system that includes a plurality of nodes and a first path calculation device, wherein the first path calculation device includes:

a service definition table that includes a plurality of correspondence information of a service identifier, a service attribute, a requirement for maintenance of a communication path, and adaptation information in association with one another, and a link attribute table that includes a plurality of correspondence information of a link identifier of a link and a maintenance attribute of the link in association with each other; and at least one of the plurality of nodes includes:

a session management table that includes a plurality of correspondence information of a session identifier, a service identifier, a service attribute, an explicit route, and adaptation information in association with one another; and wherein:

one of the plurality of nodes serving as an origin of the communication path transmits a path calculation request, which contains a service identifier and a service attribute, to the first path calculation device;

the method comprising the steps of:

determining a requirement for maintenance of the communication path, which links for hops of the communication path to be established should satisfy, on the basis of the service definition table and the service identifier and service attribute included in the path calculation request;

extracting a plurality of links, of which maintenance attributes of the link satisfy the determined requirement for maintenance, from the link attribute table based on the determined requirement for maintenance and the maintenance attributes of the link in the link attribute table, determining a candidate for a route of the communication path, which satisfies the requirement for maintenance of the communication path in relation to each of the hops, in a network formed with the extracted plurality of links, determining the adaptation information, which is about any of various connection facilities to be implemented at the end point of the communication path, by searching the service definition table on the basis of the service identifier and service attribute within the path calculation, and sending a path calculation response, which contains the determined candidate for the route and/or the adaptation information, to the first node of the one of the plurality of nodes;

if the received path calculation response contains the adaptation information, recording the adaptation information, which is contained in the received path calculation response, in the session management table in association with the service identifier, service attribute, and explicit route; and wherein the one of the plurality of nodes:

sets up an adaptation facility for itself on the basis of the adaptation information contained in the path calculation response received from the first path calculation device, and transmits a path establishment request, which contains the service identifier, service attribute, and explicit route, to other one of the plurality of nodes terminating the subsequent hop.

17. A communication network system of claim 1, wherein the requirement of maintenance is an equation of a restrictive condition that the maintenance attribute of each link along which the communication path to be established should be satisfy and wherein the first path calculation device extracts the plurality of links, of which maintenance attributes of the link satisfy the equation of a restrictive condition of the determined requirement for maintenance, from the link attribute table.

* * * * *